United States Patent
Matsui et al.

(10) Patent No.: US 11,482,195 B2
(45) Date of Patent: Oct. 25, 2022

(54) DISPLAY SYSTEM, DISPLAY DEVICE AND DISPLAY CONTROL METHOD FOR CONTROLLING A DISPLAY POSITION OF AN IMAGE BASED ON A MOVING BODY

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/132,159

(22) Filed: Dec. 23, 2020

(65) Prior Publication Data

US 2021/0110796 A1  Apr. 15, 2021

Related U.S. Application Data

(63) Continuation of application No. PCT/JP2019/040677, filed on Oct. 16, 2019.

(30) Foreign Application Priority Data

Oct. 16, 2018 (JP) .............................. JP2018-194826

(51) Int. Cl.
  *G09G 5/38* (2006.01)
  *B60K 35/00* (2006.01)

(52) U.S. Cl.
  CPC .............. *G09G 5/38* (2013.01); *B60K 35/00* (2013.01); *B60K 2370/1529* (2019.05);
  (Continued)

(58) Field of Classification Search
  None
  See application file for complete search history.

(56) References Cited

U.S. PATENT DOCUMENTS

| 10,754,154 B2 * | 8/2020 | Kasazumi | ............... B60R 11/02 |
| 2012/0008048 A1 * | 1/2012 | Sekine | .................. G06T 19/006 |
| | | | 348/566 |

(Continued)

FOREIGN PATENT DOCUMENTS

| JP | 2015-101311 | 6/2015 |
| WO | 2019/168157 | 9/2019 |

OTHER PUBLICATIONS

Translation of the International Preliminary Report on Patentability and Written Opinion of the International Searching Authority dated Apr. 29, 2021 in International (PCT) Application No. PCT/JP2019/040677.

(Continued)

*Primary Examiner* — Jason A Pringle-Parker
(74) *Attorney, Agent, or Firm* — Wenderoth, Lind & Ponack, L.L.P.

(57) ABSTRACT

The present disclosure provides a display system that includes an acquisition device, a detection device, a display processing device, and a correction processing device. The acquisition device acquires speed information indicating a speed of a moving body. The detection device detects a posture variation amount of the moving body. The display processing device controls a display position of an image based on a reference position and a correction amount. The correction processing device sets the correction amount based on the speed and the posture variation amount. The correction processing device estimates whether or not the correction amount becomes equal to or more than a predetermined amount based on the speed and the posture variation amount, and adjusts the correction amount based on the estimation result.

10 Claims, 26 Drawing Sheets

(52) U.S. Cl.
CPC .. *B60K 2370/166* (2019.05); *B60K 2370/167* (2019.05); *B60K 2370/176* (2019.05); *B60K 2370/21* (2019.05); *G09G 2340/0464* (2013.01); *G09G 2380/10* (2013.01)

(56) References Cited

U.S. PATENT DOCUMENTS

| | | | |
|---|---|---|---|
| 2013/0138321 A1* | 5/2013 | Toyoda | G06F 17/00 701/99 |
| 2014/0268353 A1* | 9/2014 | Fujimura | G02B 27/01 359/630 |
| 2016/0216521 A1 | 7/2016 | Yachida et al. | |
| 2016/0266390 A1* | 9/2016 | Seo | G09G 3/001 |
| 2017/0146799 A1* | 5/2017 | Oh | G06T 19/006 |
| 2018/0089899 A1* | 3/2018 | Piemonte | G06T 15/205 |
| 2018/0254001 A1* | 9/2018 | Koren | G06Q 50/01 |
| 2018/0335634 A1* | 11/2018 | Oliveira | G09G 3/02 |
| 2019/0139286 A1* | 5/2019 | Shimoda | B60K 35/00 |

OTHER PUBLICATIONS

International Search Report dated Dec. 24, 2019 in International (PCT) Application No. PCT/JP2019/040677.
Extended European Search Report dated Nov. 12, 2021 in European Application No. 19872634.1.

\* cited by examiner

| VEHICLE SPEED V | $V_1 \leqq V < V_2$ | $V_2 \leqq V < V_3$ | ...... | $V_{n-1} \leqq V < V_n$ |
|---|---|---|---|---|
| FIRST THRESHOLD a | $a_1$ | $a_2$ | ...... | $a_n$ | ized be a system, a method, and a computer program, and a combination of these.
DISPLAY SYSTEM, DISPLAY DEVICE AND DISPLAY CONTROL METHOD FOR CONTROLLING A DISPLAY POSITION OF AN IMAGE BASED ON A MOVING BODY

CROSS-REFERENCE TO RELATED APPLICATIONS

This is a continuation application of International Application No. PCT/JP2019/040677, with an international filing date of Oct. 16, 2019, which claims priority of Japanese Patent Application No. 2018-194826 filed on Oct. 16, 2018, the content of which is incorporated herein by reference.

BACKGROUND

1. Technical Field

The present disclosure relates to a display system, a display device, and a display control method for controlling a display position of an image according to a movement of a moving body.

2. Description of Related Art

JP 2015-101311 A discloses a vehicle information display system that performs augmented reality (AR) display using a head-up display (HUD) device. The HUD device projects light representing a virtual image on the windshield of a vehicle so that a viewer who is an occupant of the vehicle visually recognizes the virtual image together with an actual view of the outside world of the vehicle. For example, a virtual image representing a guide route of the vehicle is displayed in association with a display target, for example, a road, in an actual view. In this manner, the occupant can confirm the guide route while visually recognizing the actual view. The vehicle information display system of Patent Document 1 corrects a display position of the virtual image according to an acceleration. This restricts generation of position displacement of the virtual image when the vehicle is suddenly decelerated and suddenly accelerated.

SUMMARY

When an attempt is made to correct position displacement of an image, the correction process may be noticeable to a viewer.

The present disclosure provides a display system, a display device, and a display control method in which position displacement of an image is accurately suppressed and appearance quality of position displacement correction is improved.

A display system of the present disclosure includes an acquisition device that acquires speed information indicating a speed of a moving body, a detection device that detects a posture variation amount of the moving body, a display processing device that controls a display position of an image based on a reference position and a correction amount, and a correction processing device that sets the correction amount based on the speed and the posture variation amount. The correction processing device estimates whether or not the correction amount becomes equal to or more than a predetermined amount based on the speed and the posture variation amount, and adjusts the correction amount based on the estimation result.

A display device of the present disclosure includes an acquisition unit that acquires speed information indicating a speed of a moving body and variation amount information indicating a posture variation amount of the moving body, a display that displays an image at a display position based on a reference position and a correction amount, and a controller that sets the correction amount based on the speed and the posture variation amount. The controller sets a threshold based on the speed, sets the correction amount based on the posture variation amount during a period in which the posture variation amount is equal to or less than the threshold, and returns the display position to the reference position during a period in which the posture variation amount is larger than the threshold.

A display control method of the present disclosure is a display control method performed by an arithmetic unit of a computer. The display control method includes the steps of acquiring speed information indicating a speed of a moving body and variation amount information indicating a posture variation amount of the moving body, and controlling a display position of an image based on a reference position and a correction amount. The step of controlling the display position includes setting a threshold based on the speed, setting the correction amount based on the posture variation amount during a period in which the posture variation amount is equal to or less than the threshold, and returning the display position to the reference position during a period in which the posture variation amount is larger than the threshold.

These general and specific aspects may be realized by a system, a method, and a computer program, and a combination of these.

According to the display system of the present disclosure, it is possible to accurately suppress the position displacement of an image and improve the appearance quality of position displacement correction. For example, in a case where a correction amount corresponding to a posture variation amount is estimated to be equal to or more than a predetermined amount, the correction amount is reset, and in a case where the correction amount is estimated to remain less than the predetermined amount, adjustment by correction is performed, so that highly accurate position displacement correction that achieves both correction and resetting and quality of appearance at the time of resetting can be realized. Further, according to the display device and the display control method of the present disclosure, a threshold of the posture variation amount is set according to a speed of a moving body. Accordingly, in the control of a display position based on the posture variation amount, the position displacement of an image can be suppressed accurately.

DETAILED DESCRIPTION (Findings that Form the Basis of the Present Disclosure)

In a case where a display position of an image is corrected according to a state of a moving body detected based on the output of a sensor, for example, a posture of the moving body, a correction error due to noise of the sensor is generated.

For example, it is conceivable to use a gyro sensor in order to detect, with high accuracy, vibration of a moving body due to a shape such as unevenness of a road surface. A roll angle, a pitch angle, and a yaw angle, which are angles in three axial directions of the moving body are obtained by integrating the angular velocities detected by the gyro sensor. However, in the gyro sensor, due to the characteristics of a device, the angular velocity of the output does not become zero even in a stationary state. What is called drift occurs. Therefore, in the integral calculation of the angular velocity, an error due to the drift is accumulated, and an error is generated in the obtained angle. In this case, if a display position of an image is continuously corrected based on the output of the gyro sensor, the correction error becomes large. For this reason, when correction is made constantly or for a long time based on the output of the sensor, correction errors are accumulated and a display position of an image is displaced. For example, in a case of an HUD system that performs augmented reality (AR) display, a display position of a virtual image may be significantly displaced with respect to a predetermined display target in an actual view, for example, a road. Therefore, a viewer feels uncomfortable with the display of the image.

In order to eliminate the accumulated errors generated as described above, it is conceivable to simply reset a correction amount. A correction amount can be reset by returning a display position of a virtual image to a reference position.

However, if a correction amount is reset at an optional timing, for example, if a correction amount is reset during position displacement correction, superposition displacement becomes significant. Further, when reset operation is visually recognized, the viewer feels uncomfortable. As described above, simply resetting a correction amount causes impairment of correction performance and deterioration of appearance quality.

In the display system, the display device, and the display control method of the present disclosure, the image is displayed at a display position based on a reference position and a correction amount set according to a posture variation amount during a period in which the posture variation amount of the moving body is equal to or less than a threshold. The display device and the display system of the present disclosure return the display position of the image to the reference position when the posture variation amount is larger than the threshold. The posture variation amount is specifically an angular velocity output by the gyro sensor.

Figure 25:
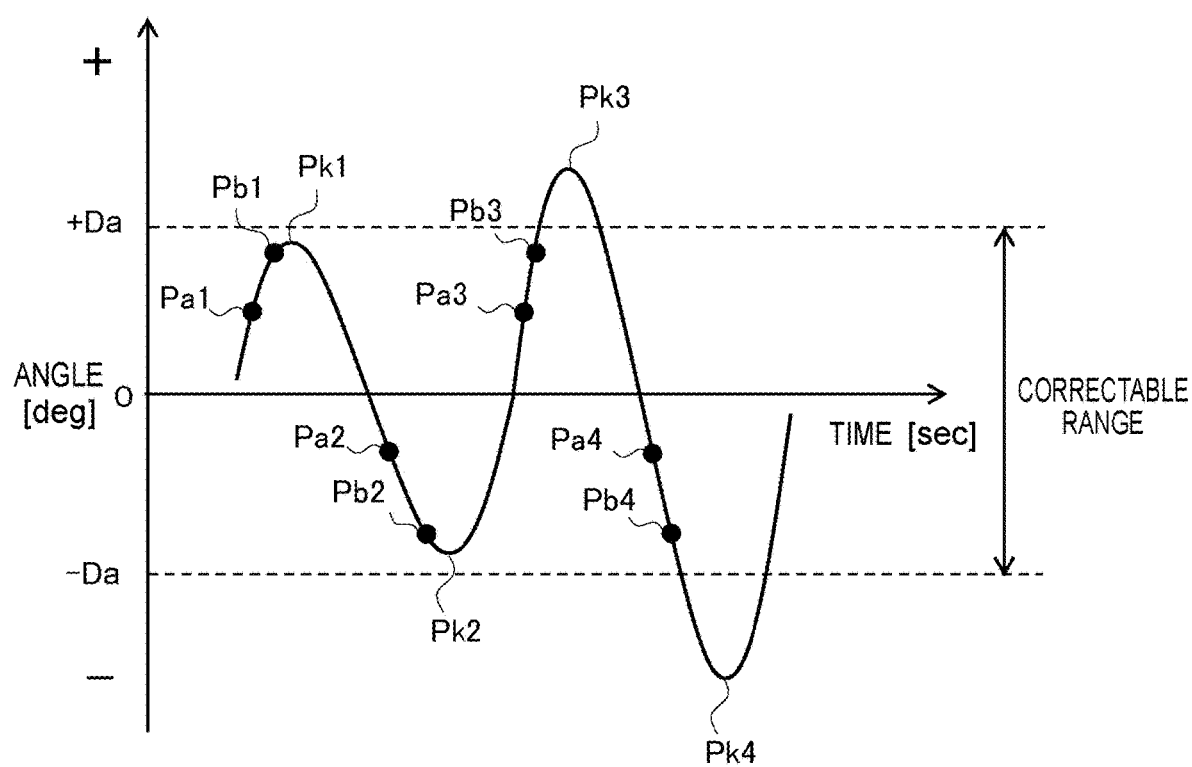
FIG. 25 is an explanatory diagram showing a time change in an angle detected by a gyro sensor.

That the superposition displacement becomes significant if resetting is performed during position displacement correction will be described with reference to FIG. 25. FIG. 25 is an explanatory diagram showing a time change in an angle detected by the gyro sensor. An inclination of the graph in FIG. 25 indicates the angular velocity. A displacement amount of an angle is detected according to a vibration amplitude of the moving body, and a displacement amount of the detected angle is converted to a correction amount. As shown in FIG. 25, there is a limit to a displacement amount for which position displacement correction can be performed, and in a case where position displacement that exceeds a correction range is generated, a portion of the position displacement exceeding the correction range cannot be corrected, so superposition accuracy deteriorates. If the correction amount is reset at a timing the correction cannot be performed, deterioration of the superposition accuracy due to resetting can be suppressed. Therefore, the fact that displacement amount exceeds the correction range is detected by comparing the amount with a threshold. By resetting the correction amount based on this determination result, it is possible to effectively utilize a period in which the position displacement correction cannot be performed.

Further, although the above-described determination of the displacement amount is preferably performed using a displacement amount based on a calculated angle, as shown in FIG. 25, there is a case where determination is made at timings Pb1 and Pb2 at which there is little change in an outside view near peaks Pk1 and Pk2 of an amplitude, and there is a case where reset operation is conspicuous. Therefore, for resetting of the correction amount, reset determination needs to be performed earlier, before the displacement amount exceeds the correction range and before a peak of the vibration amplitude is reached. In view of the above, it is desirable to use the angular velocity instead of the displacement amount based on an angle. For example, by comparison with a threshold based on the angular velocities at the timings Pb1 and Pb2, it is possible to predict that the peaks Pk1 and Pk2 after a predetermined time elapses are included in the correctable range. In this case, the reset operation is not performed. Further, by comparison with a threshold based on the angular velocities at timings Pb3 and Pb4, it is possible to predict that peaks Pk3 and Pk4 after a predetermined time elapses are not included in the correctable range. In this case, the reset operation is performed at a timing at which the value is out of the correctable range. This can prevent the reset process from being conspicuous. Further, at the timings Pa1 to Pa4, in a case where the angular velocity exceeds the threshold, it is possible to determine that the change in the outside view is large, and perform the reset operation.

Furthermore, by changing the threshold for the determination based on the angular velocity, more accurate determination (estimation) can be performed. When the moving body is moving at high speed, the vibration frequency of the moving body is high, so the angular velocity detected by the gyro sensor is high even with a small amplitude, as compared with low-speed traveling. For this reason, at the time of high-speed movement, the angular velocity tends to become larger than the threshold, and, for example, even in a case where the displacement amount is within the correction range and the position displacement correction can be performed, resetting is performed due to erroneous determination, and a display position of the image may be frequently returned to the reference position. Therefore, for example, at the time of high-speed movement, correction of the display position is hardly performed, which may cause impairment of the correction performance and deterioration of the appearance quality. On the other hand, when the moving body is moving at low speed, the vibration frequency of the moving body is low, so the angular velocity detected by the gyro sensor is small even with a large amplitude, as compared with high-speed traveling. For this reason, at the time of low-speed movement, the angular velocity tends to be smaller than the threshold, and, for example, correction of the display position is constantly performed. Therefore, for example, at the time of low-speed movement, the display position of the image is not often returned to the reference position. Further, since the case where the displacement amount exceeds the correction range cannot be detected and the chance of resetting is missed, the error due to integration may be accumulated and the correction performance may be impaired.

Therefore, the display system, the display device, and the display control method of the present disclosure set the threshold of the angular velocity for determining whether or not to return the display position to the reference position according to the speed of the moving body. Specifically, the threshold is increased as the speed increases. This makes it possible to determine (estimate) a vibration amplitude (displacement amount) based on the speed and angular velocity of the moving body. When the vibration amplitude is within the correction range, the position displacement correction is performed, and, when there is a large change in the outside view in a case where the vibration amplitude exceeds the correction range and the position displacement correction cannot be performed, resetting for eliminating the accumulated error of the correction value is performed. In this manner, the position displacement correction of the image with high accuracy that achieves both the elimination of the accumulated error and the appearance quality can be performed while the accuracy of the position displacement correction is maintained. For example, even when the moving body is moving at high speed, the display position can be corrected. Further, even when the moving body is moving at low speed, the display position can be returned to the reference position. By changing the display position by the correction amount based on the angular velocity, it is possible to accurately suppress the position displacement of the image due to a posture change. Further, by returning the display position to the reference position, it is possible to reduce the correction error due to the drift of the gyro sensor. Note that, in the present disclosure, "to return the display position to the reference position" includes both to completely return the display position to the reference position and to partially return the display position by making the display position closer to the reference position.

First Embodiment

Hereinafter, the first embodiment will be described with reference to the drawings. In the first embodiment, a case where the moving body is a vehicle such as an automobile and the display system is a head-up display (HUD) system that displays a virtual image in front of the windshield of the vehicle will be described as an example. In the first embodiment, the correction amount of the display position is reset to zero during a period in which the angular velocity of the vehicle is larger than a first threshold. In this manner, the display position of the virtual image is returned to the reference position. The angular velocity of the vehicle is an example of the posture variation amount of the vehicle.

1. Configuration of Display System

A configuration of the display system of the present embodiment will be described with reference to FIGS. 1 to 3.

Figure 1:
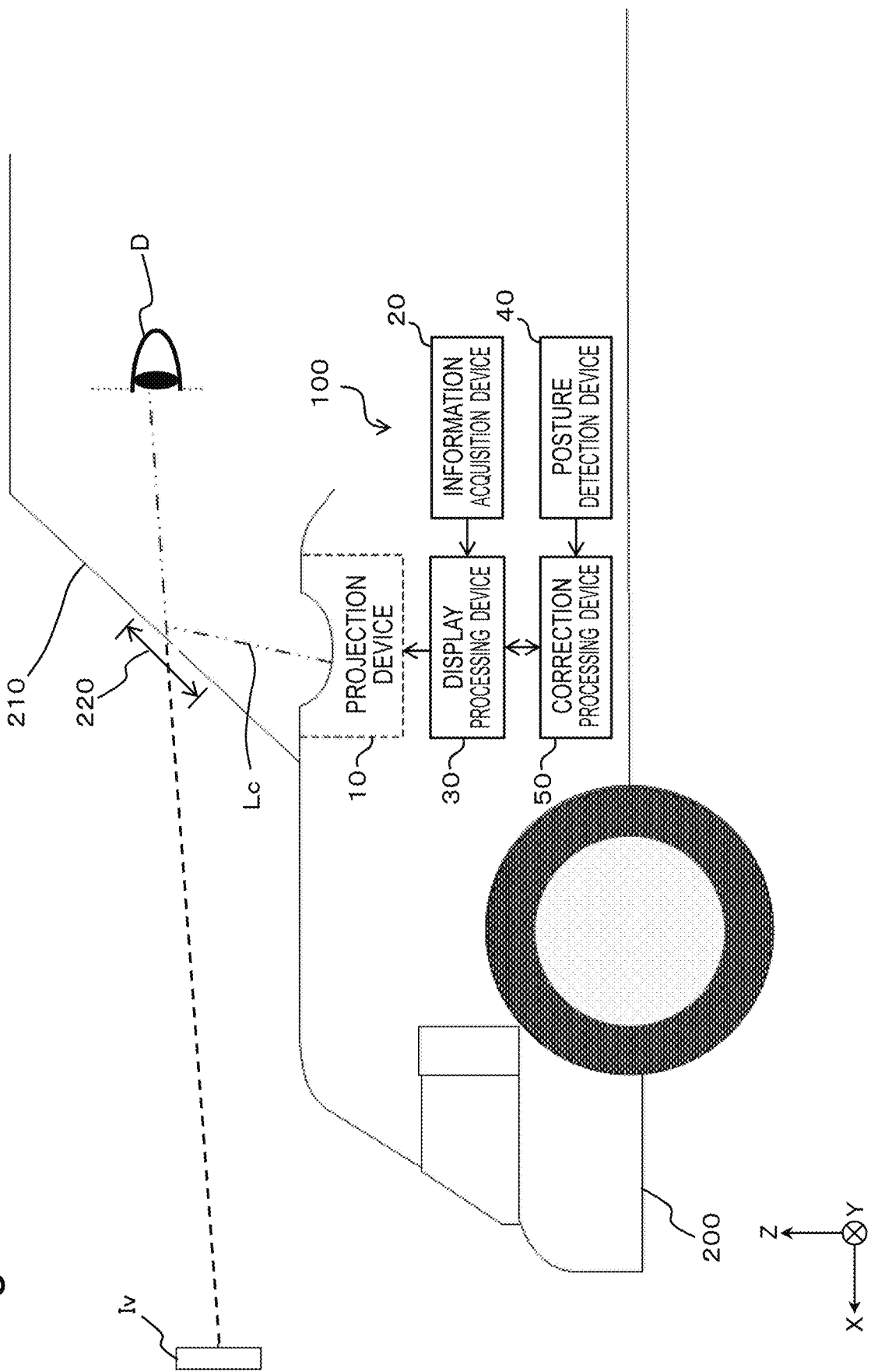
FIG. 1 is a diagram for explaining a head-up display (HUD) according to a first embodiment.

FIG. 1 is a diagram for explaining an HUD. In FIG. 1, a roll axis of a vehicle 200 is the X axis, a pitch axis of the vehicle 200 is the Y axis, and a yaw axis of the vehicle 200 is the Z axis. That is, the X axis is an axis that is orthogonal to the Y axis and the Z axis and is along a line-of-sight direction of an occupant D who visually recognizes a virtual image Iv. The Y axis is an axis along the left-right direction when viewed from the occupant D who visually recognizes the virtual image Iv. The Z axis is an axis along the height direction of the vehicle 200.

A display system 100 of the present embodiment is an HUD system that performs what is called augmented reality (AR) display in which the virtual image Iv is superimposed on an actual view in front of a windshield 210 of the vehicle 200. The virtual image Iv indicates predetermined information. For example, the virtual image Iv is a figure and a character indicating a route for guiding to a destination, an estimated time of arrival at the destination, a traveling direction, a speed, various warnings, and the like. The display system 100 is installed in the vehicle 200 and projects display light Lc representing the virtual image Iv into a display area 220 of the windshield 210 of the vehicle 200. In the present embodiment, the display area 220 is a partial area of the windshield 210. Note that the display area 220 may be the entire area of the windshield 210. The display light Lc is reflected by the windshield 210 toward the inside of the vehicle. In this manner, the occupant D in the vehicle 200 visually recognizes the reflected display light Lc as the virtual image Iv in front of the vehicle 200.

The display system 100 includes a projection device 10, an information acquisition device 20, a display processing device 30, a posture detection device 40, and a correction processing device 50.

The projection device 10 projects the display light Lc representing the virtual image Iv into the display area 220. The projection device 10 includes, for example, a liquid crystal display element that displays an image of the virtual image Iv, a light source such as an LED that illuminates the liquid crystal display element, a mirror and a lens that reflect the display light Lc of the image displayed by the liquid crystal display element onto the display area 220, and the like. The projection device 10 is installed, for example, in the dashboard of the vehicle 200.

The information acquisition device 20 acquires information indicating a position of the vehicle, a condition outside the vehicle, and a speed of the vehicle 200 traveling on the road. Specifically, the information acquisition device 20 measures a position of the vehicle 200 and generates position information indicating the position. The information acquisition device 20 generates outside-vehicle information indicating an object, a distance to the object, and the like. The object is a person, a sign, a road, or the like. The information acquisition device 20 detects the speed of the vehicle 200 and generates speed information indicating the speed of the vehicle 200. The information acquisition device 20 outputs the position information, the outside-vehicle information, and the speed information of the vehicle 200.

The display processing device 30 controls the display of the virtual image Iv based on the position information and the outside-vehicle information of the vehicle 200 obtained from the information acquisition device 20 and outputs image data of the virtual image Iv to the projection device 10. The display processing device 30 outputs the speed information of the vehicle 200 acquired from the information acquisition device 20 to the correction processing device 50, and acquires a correction amount of the display position of the virtual image Iv from the correction processing device 50.

The posture detection device 40 detects the angular velocity of the vehicle 200 and outputs angular velocity information indicating the detected angular velocity.

The correction processing device 50 calculates the correction amount of the display position of the virtual image Iv based on the angular velocity information of the vehicle 200 output from the posture detection device 40 and the speed information of the vehicle 200 output from the information acquisition device 20. The correction processing device 50 outputs the calculated correction amount to the display processing device 30.

Figure 2:
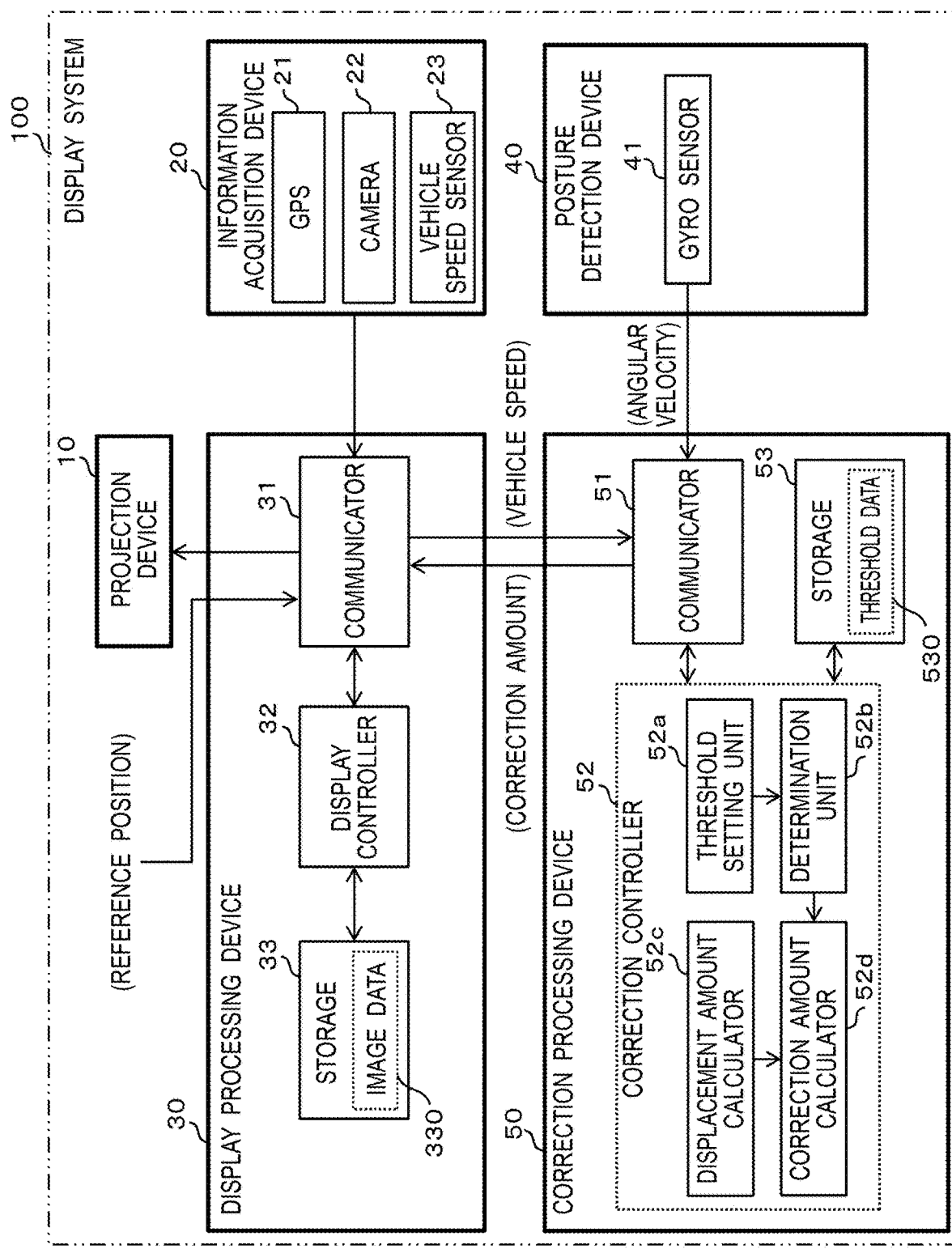
FIG. 2 is a block diagram showing a configuration of a display system according to the first embodiment.

FIG. 2 is a block diagram showing an internal configuration of the display system 100.

In the present embodiment, the information acquisition device 20 includes a global positioning system (GPS) module 21, a camera 22, and a vehicle speed sensor 23.

The GPS module 21 detects the position indicating the current position of the vehicle 200 in a geographical coordinate system. Specifically, the GPS module 21 receives radio waves from GPS satellites and measures the latitude and longitude of the receiving point. The GPS module 21 generates position information indicating the measured latitude and longitude.

The camera 22 captures an outside view and generates captured image data. The information acquisition device 20 identifies, for example, an object from the captured image data and measures a distance to the object by image processing. The information acquisition device 20 generates, as the outside-vehicle information, information indicating an object, a distance to the object, and the like.

The vehicle speed sensor 23 detects the speed of the vehicle 200 and generates the speed information indicating the detected speed.

The information acquisition device 20 outputs the position information, the outside-vehicle information, and the speed information to the display processing device 30. Note that the captured image data generated by the camera 22 may be output to the display processing device 30.

The display processing device 30 includes a communicator 31, a display controller 32, and a storage 33.

The communicator 31 includes a circuit that communicates with an external device according to a predetermined communication standard. The predetermined communication standard includes, for example, LAN, Wi-Fi (registered trademark), Bluetooth (registered trademark), USB, HDMI (registered trademark), controller area network (CAN), and serial peripheral interface (SPI).

The display controller 32 can be realized by a semiconductor element or the like. The display controller 32 can be composed of, for example, a microcomputer, a CPU, an MPU, a GPU, a DSP, an FPGA, and an ASIC. A function of the display controller 32 may be configured only by hardware, or may be realized by combining hardware and software. The display controller 32 realizes a predetermined function by reading data and a program stored in the storage 33 and performing various types of arithmetic processing.

The storage 33 is a storage medium that stores a program and data required to realize a function of the display processing device 30. The storage 33 can be realized by, for example, a hard disk (HDD), an SSD, a RAM, a DRAM, a ferroelectric memory, a flash memory, a magnetic disk, or a combination of these.

The storage 33 stores a plurality of pieces of image data 330 representing the virtual image Iv.

The display controller 32 determines the virtual image Iv to be displayed based on the position information and the outside-vehicle information obtained from the information acquisition device 20. The display controller 32 reads out the image data 330 of the determined virtual image Iv from the storage 33 and outputs the data to the projection device 10. The display controller 32 acquires information indicating the reference position for displaying the virtual image Iv from an external device (not shown) via the communicator 31. The display controller 32 outputs the speed information indicating the vehicle speed acquired from the information acquisition device 20 to the correction processing device 50, and acquires a correction amount of the display position from the correction processing device 50. The display controller 32 sets the display position of the virtual image Iv based on the reference position and the correction amount.

The posture detection device 40 includes a gyro sensor 41 that detects an angular velocity. The gyro sensor 41 outputs angular velocity information indicating the detected angular velocity to the correction processing device 50.

The correction processing device 50 includes a communicator 51, a correction controller 52, and a storage 53.

The communicator 51 includes a circuit that communicates with an external device according to a predetermined communication standard. The predetermined communication standard includes, for example, LAN, Wi-Fi (registered trademark), Bluetooth (registered trademark), USB, HDMI (registered trademark), controller area network (CAN), and serial peripheral interface (SPI).

The correction controller 52 can be realized by a semiconductor element or the like. The correction controller 52 can be composed of, for example, a microcomputer, a CPU, an MPU, a GPU, a DSP, an FPGA, and an ASIC. A function of the correction controller 52 may be configured only by hardware, or may be realized by combining hardware and software. The correction controller 52 realizes a predetermined function by reading data and a program stored in the storage 53 and performing various types of arithmetic processing.

The storage 53 is a storage medium that stores a program and data required to realize a function of the correction processing device 50. The storage 53 can be realized by, for example, a hard disk (HDD), an SSD, a RAM, a DRAM, a ferroelectric memory, a flash memory, a magnetic disk, or a combination of these.

The storage 53 stores threshold data 530 indicating a threshold according to a vehicle speed.

The correction controller 52 includes a threshold setting unit 52a, a determination unit 52b, a displacement amount calculator 52c, and a correction amount calculator 52d as a functional configuration.

The threshold setting unit 52a sets a first threshold a which is a threshold of the angular velocity based on the speed information of the vehicle 200 and the threshold data 530.

The determination unit 52b compares the angular velocity of the vehicle 200 with the first threshold a set by the threshold setting unit 52a, and outputs a comparison result. When the determination unit 52b determines that the magnitude of the angular velocity is larger than the first threshold a, the correction amount can be estimated to be equal to or more than a predetermined amount and exceeds the correctable range. Further, when the determination unit 52b determines that the magnitude of the angular velocity is equal to or less than the first threshold a, the correction amount is estimated to be less than the predetermined amount and within the correctable range.

The displacement amount calculator 52c calculates the posture (angle displacement amount) of the vehicle 200 based on the posture variation information output by the posture detection device 40. For example, the displacement amount calculator 52c calculates an angle (a pitch angle) around a pitch axis of the vehicle 200 by integrating the angular velocity detected by the gyro sensor 41. In this manner, a displacement amount (angle) of the vehicle 200 in a rotation direction around the Y axis (pitch axis) shown in FIG. 1 can be calculated. Similarly, a yaw angle or a roll angle may be calculated, and, for example, all the angles around the X axis, the Y axis, and the Z axis may be calculated. This makes it possible to calculate a displacement amount of the vehicle 200 around the X axis, the Y axis, and the Z axis shown in FIG. 1, that is, in the roll direction, the pitch direction, and the yaw direction. Note that, in the present embodiment, all angles around the three axes are calculated. However, an angle around one axis or two axes may also be calculated. For example, the configuration may be such that only angles around the Y axis and the Z axis are calculated.

The correction amount calculator 52d calculates a correction amount of the display position of the virtual image Iv according to the posture (angle displacement amount) of the vehicle 200. The correction amount is indicated by the number of pixels, for example. Specifically, the correction amount calculator 52d converts the displacement amounts of the pitch angle and the yaw angle calculated by the displacement amount calculator 52c from angles into the number of pixels, and determines a correction amount by which the number of pixels corresponding to the displacement is eliminated. For example, for the roll angle, the correction amount calculator 52d determines a correction amount by which the displacement amount of the roll angle is eliminated without conversion of the angle. The correction amount calculator 52d outputs the calculated correction amount to the display processing device 30.

As described above, the display processing device 30 and the correction processing device 50 bidirectionally communicate with each other by the communicators 31 and 51. The display processing device 30 outputs the speed information indicating a vehicle speed to the correction processing device 50. The correction processing device 50 outputs information indicating a correction amount to the display processing device 30.

Figures 3, 4A:
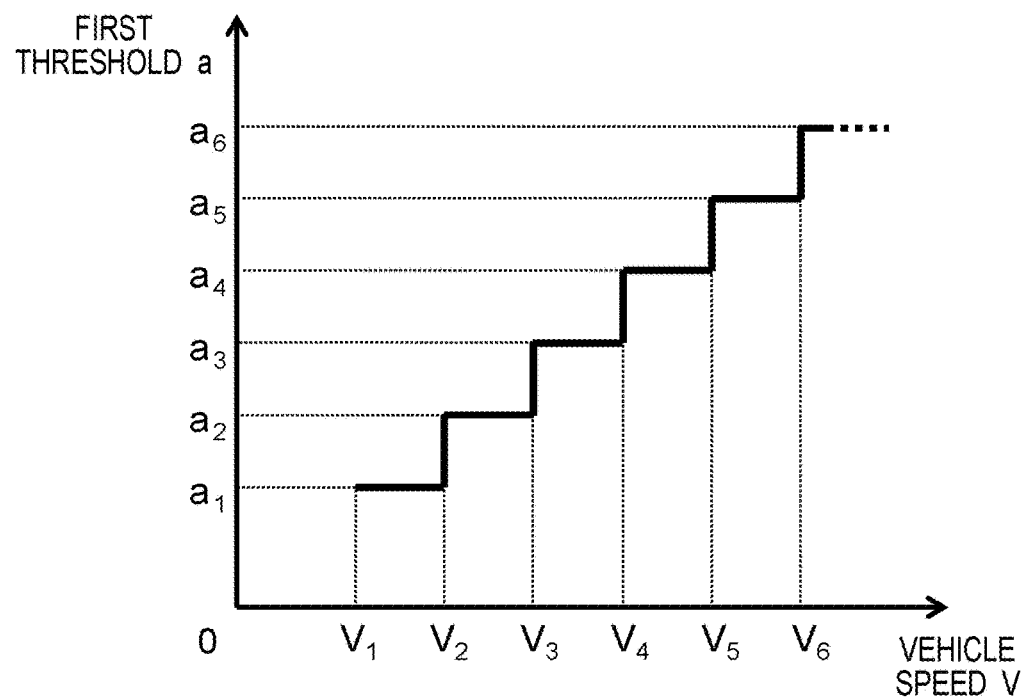
FIG. 3 is a diagram showing an example of threshold data.
FIG. 4A is a graph showing a threshold according to vehicle speed.

FIG. 3 shows an example of the threshold data 530. The threshold data 530 is a table showing the first threshold a corresponding to a vehicle speed V. FIG. 4A is a diagram showing the threshold data 530 by a graph. The first threshold a is set so as to increase stepwise based on the vehicle speed V such that the first threshold a increases as the vehicle speed V increases. The threshold setting unit 52a compares the speed information of the vehicle 200 with the threshold data 530 and sets the first threshold a corresponding to the speed V of the vehicle 200. Further, the first threshold a may be set by a function that depends on the vehicle speed V. For example, the threshold a may be expressed by a linear function ($a=k \times V+b$) as in the graph shown in FIG. 4B. Here, k represents an inclination and b represents an intercept. Further, the threshold a may also be represented by a quadratic or higher function or an exponential function. Further, a different function may be set for each range of the speed V.

2. AR Display

AR display will be described with reference to FIGS. 5 to 10.

Figure 5:
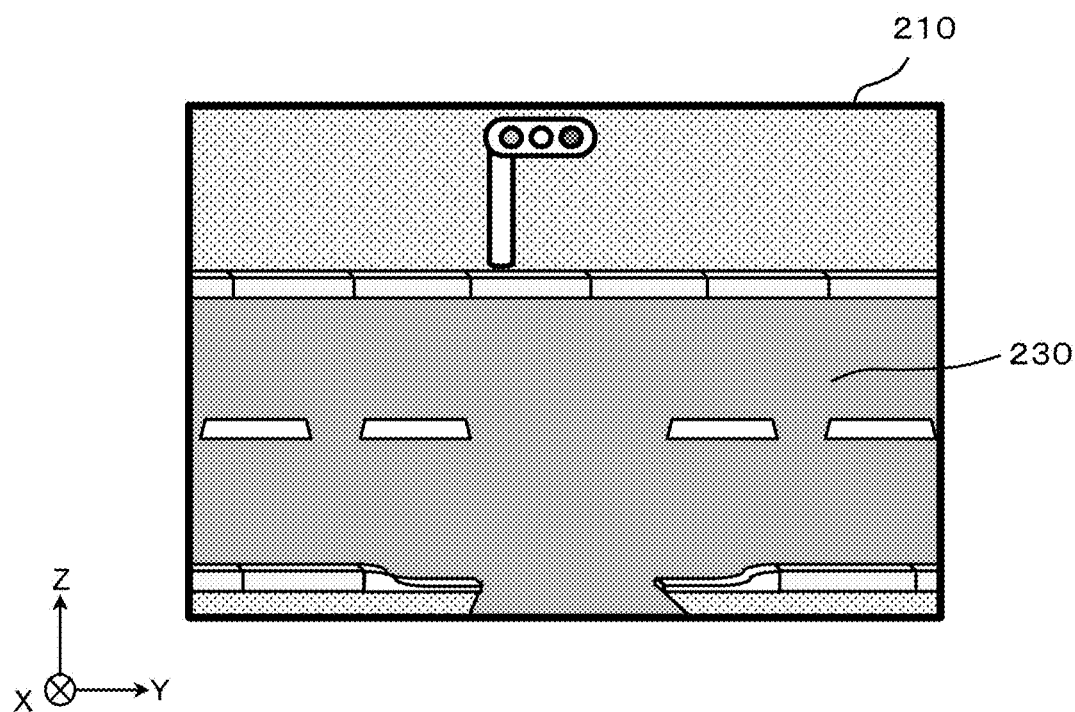
FIG. 5 is a diagram showing an example of an actual view as seen from a windshield.
Figure 6:
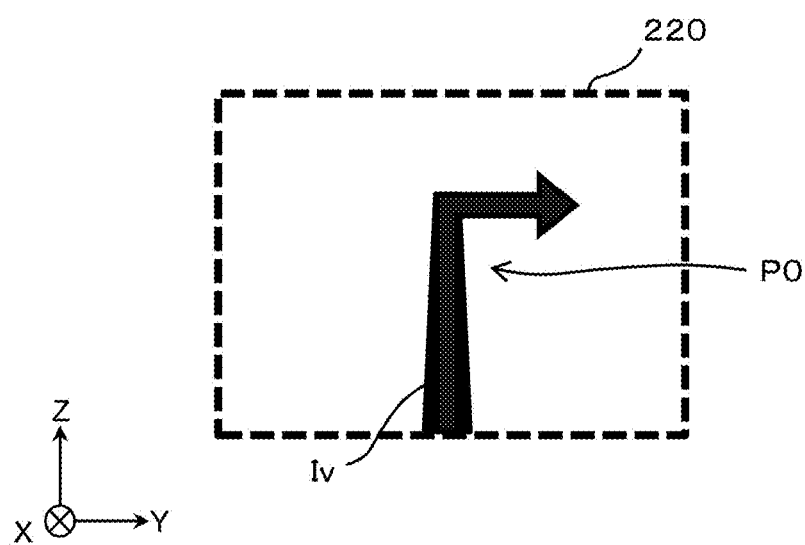
FIG. 6 is a diagram showing an example of a virtual image.

FIG. 5 shows an example of an actual view seen from the windshield 210 of the vehicle 200. FIG. 6 shows an example of the virtual image Iv seen from the display area 220. The display system 100 superimposes the virtual image Iv shown in FIG. 6 on the actual view shown in FIG. 5. A reference position P0 of the virtual image Iv is a position determined based on the type of the virtual image Iv, the state of the vehicle 200, for example, a position and a posture of the vehicle 200, map data, and the like, and the reference position P0 is determined by an external device. For example, in a case where a display target 230 is a cruising lane and the virtual image Iv is an arrow indicating a traveling direction, a display position of an arrow when the arrow indicates the center of the cruising lane at the time the vehicle is stationary is the reference position P0. The reference position P0 is set, for example, at a position of a pixel on liquid crystal display corresponding to the values of the Y coordinate and the Z coordinate in the display area 220 in FIG. 6. The reference position P0 is acquired from an external device. The external device includes, for example, a microcomputer, a CPU, an MPU, a GPU, a DSP, an FPGA, or an ASIC and the GPS module 21. A function of the external device may be configured only by hardware, or may be realized by combining hardware and software. The information indicating the reference position P0 output from the external device may change based on the number of occupants, a change in load, and a change in posture due to a decrease in gasoline, or the like. Therefore, for example, the reference position P0 acquired from the external device may be different from an initial position that is acquired initially. Therefore, the display processing device 30 may change the reference position P0 acquired from the external device based on the number of occupants, the change in the load, and the variation in the posture due to the decrease in gasoline and the like. Note that the display processing device 30 may set the reference position P0 based on the position information, the outside-vehicle information, the map data, and the like. The display processing device 30 may set the size of the virtual image Iv based on the position information and the outside-vehicle information.

Figure 7A:
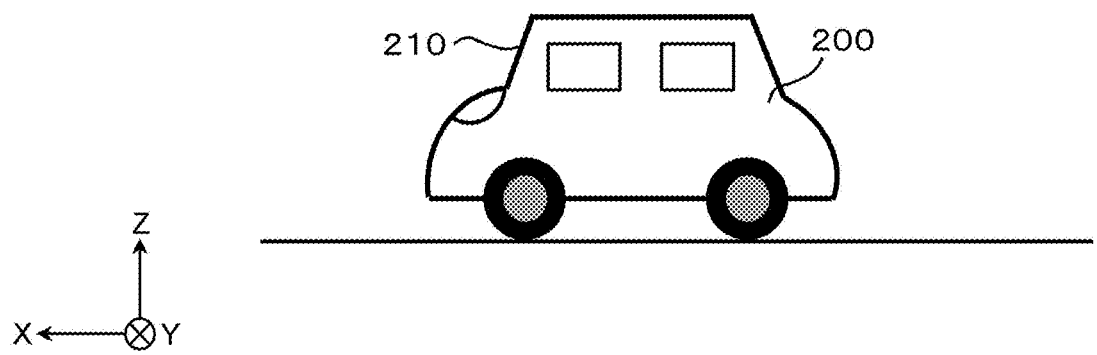
FIG. 7A shows a vehicle that is not leaning.
Figure 7B:
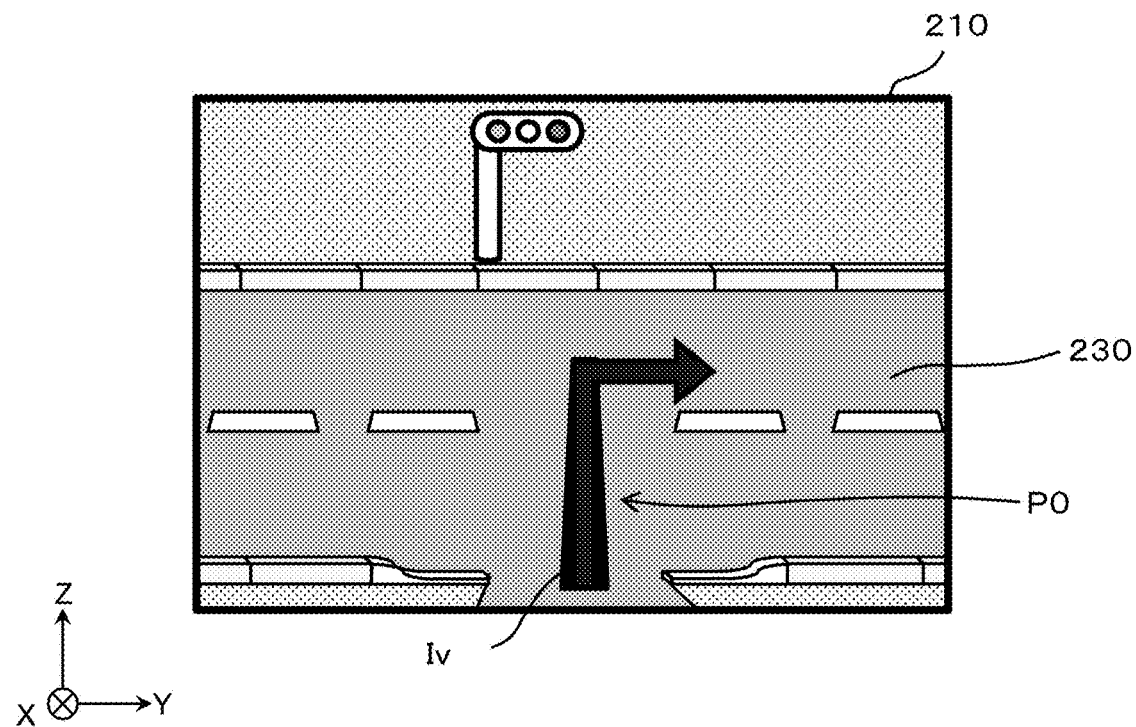
FIG. 7B is a diagram for explaining an example in which a virtual image is displayed at a reference position when a vehicle is not leaning.

FIG. 7A shows the vehicle 200 not leaning. FIG. 7B shows a display example of the virtual image Iv when the vehicle 200 is not leaning. FIG. 7B shows a state in which the virtual image Iv shown in FIG. 6 is displayed in a manner superimposed on the actual view shown in FIG. 5. When the vehicle 200 is not leaning, if the virtual image Iv is displayed at the reference position P0 as shown in FIG. 7B, the virtual image Iv appears at a desired position to display, for example, the center of a cruising lane.

Figure 8A:
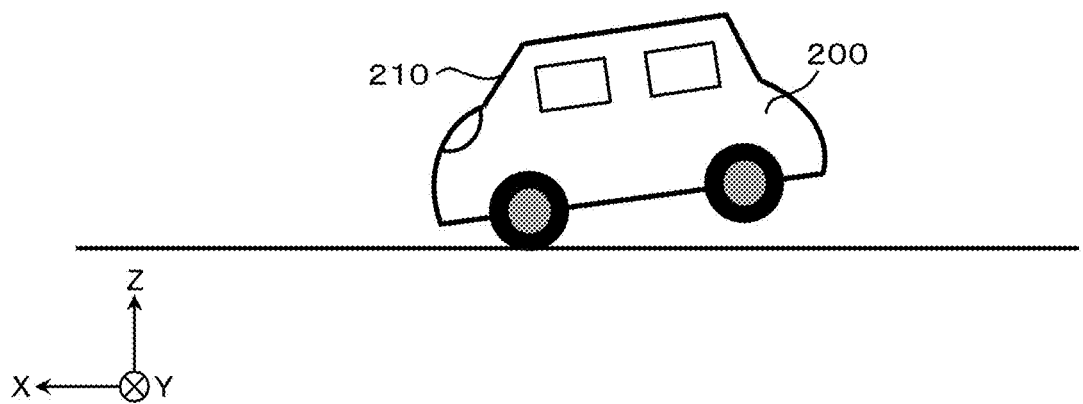
FIG. 8A shows a vehicle in a forward leaning posture.
Figure 8B:
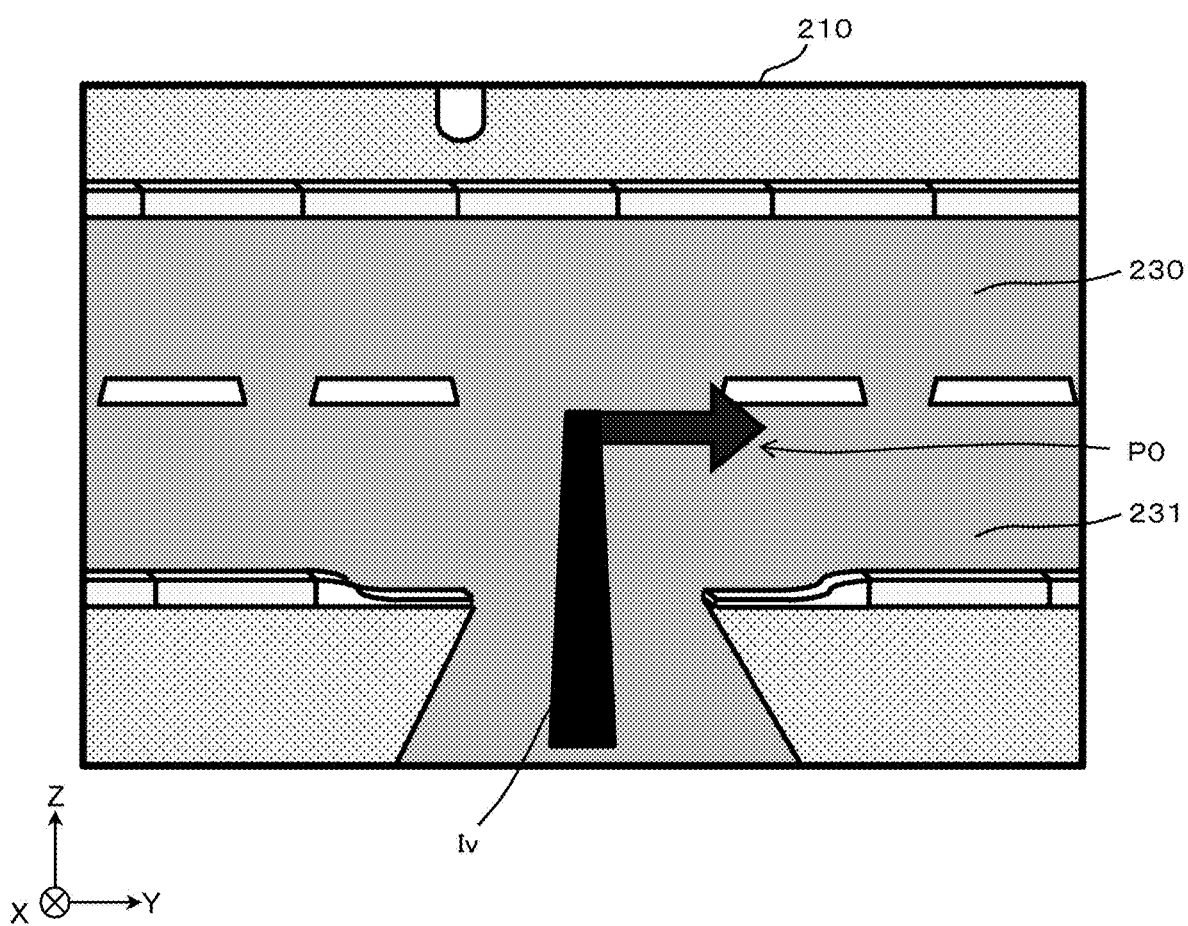
FIG. 8B is a diagram for explaining an example in which position displacement of a virtual image is generated when a vehicle is in the forward leaning posture.

FIG. 8A shows the vehicle 200 in a forward leaning posture. FIG. 8B shows a display example of the virtual image Iv when the vehicle 200 is in the forward leaning posture. FIG. 83 illustrates a case where the display position of the virtual image Iv is displaced from the display target 230 according to the posture variation of the vehicle 200. The vehicle 200 may lean due to unevenness of the road surface, sudden acceleration or deceleration of the vehicle 200, or the like. For example, when the vehicle 200 suddenly decelerates, the vehicle 200 takes a forward leaning posture as shown in FIG. 8A. In this case, as shown in FIG. 8B, the position of display target 230 seen from windshield 210 changes according to the inclination of the vehicle 200. For this reason, in a case where the virtual image Iv is displayed at the reference position P0, the virtual image Iv is displaced from the display target 230. For example, as shown in FIG. 8B, the tip of the arrow is in an opposite lane 231. Therefore, the display system 100 adjusts the display position of the virtual image Iv in the direction of eliminating the displacement according to the posture of the vehicle 200.

Figure 9:
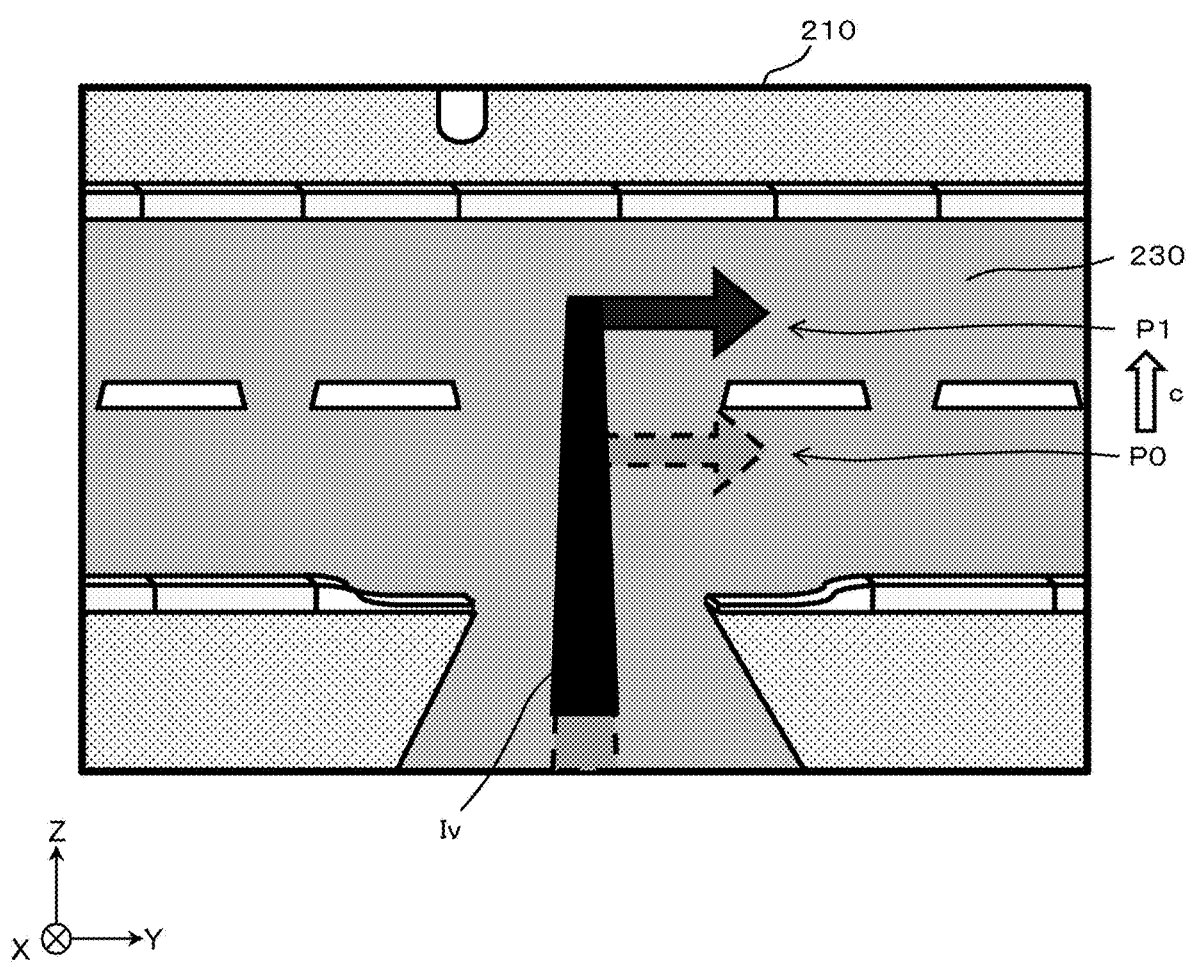
FIG. 9 is a diagram for explaining correction of a display position of a virtual image.

FIG. 9 shows the display position of the virtual image Iv before and after correction. The correction processing device 50 calculates a correction amount c so that the display position of the virtual image Iv is a position P1 where there is no displacement due to the angle of the vehicle 200. That is, the display processing device 30 sets the display position of the virtual image Iv to "reference position P0+correction amount c". In this manner, the projection device 10 can display the virtual image Iv at the position P1 where it displays the image with respect to the display target 230. As described above, even in a case where the vehicle 200 leans, the display position of the virtual image Iv is changed from the reference position P0 based on the correction amount c, so that the virtual image Iv can be displayed at the position P1 where it displays the image with respect to the display target 230 in the actual view.

Figure 10:
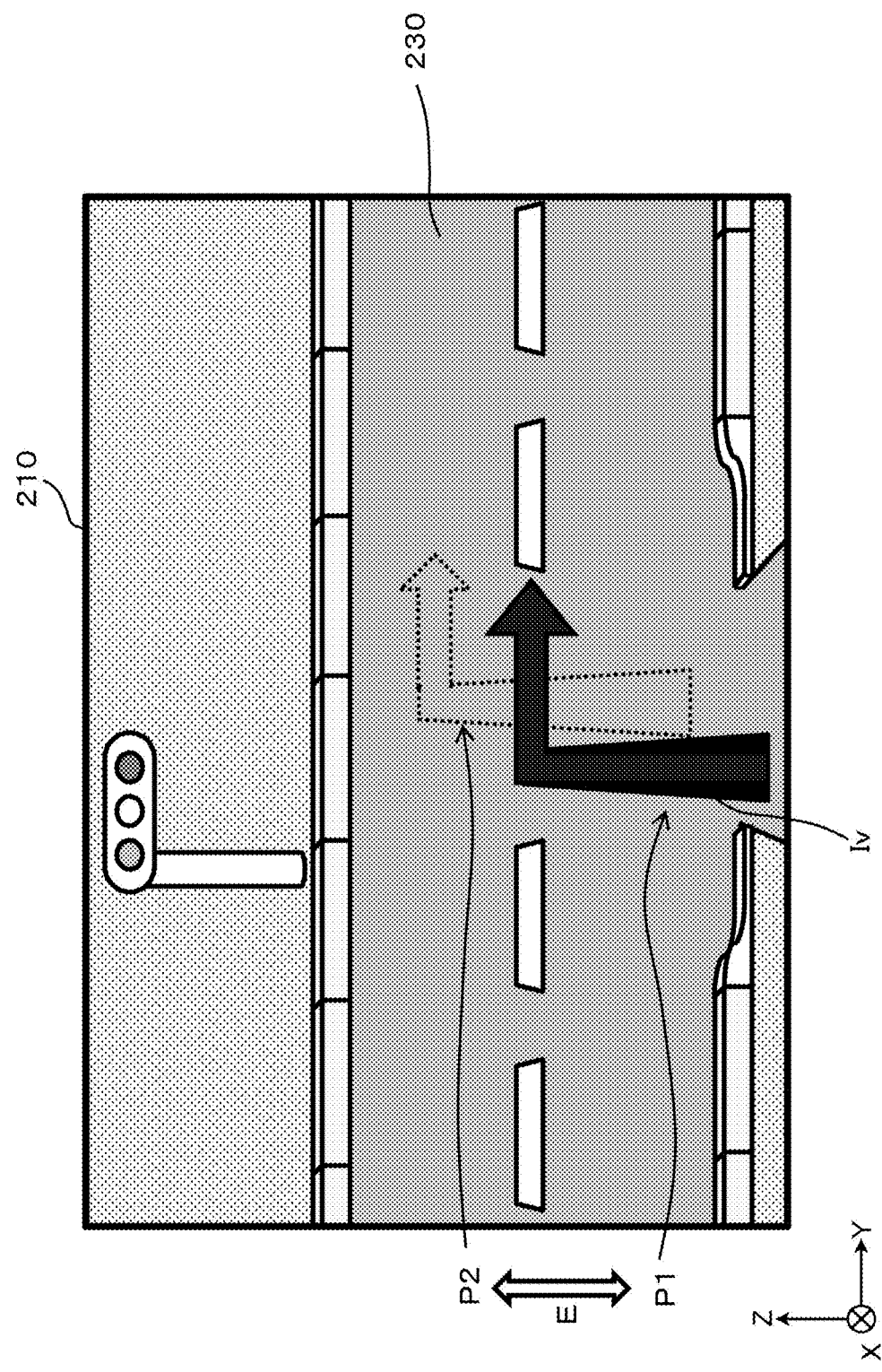
FIG. 10 is a diagram for explaining position displacement of a virtual image due to noise of a gyro sensor.

FIG. 10 illustrates a case where the display position of the virtual image Iv is displaced from the display target 230 due to noise of the gyro sensor 41. As described above, for example, the angular velocity detected by the gyro sensor 41 includes an error due to drift. Therefore, if the correction amount c is calculated based on the integral calculation of the angular velocity, the correction amount c contains an error. In this case, for example, even in a case where the vehicle 200 is stopped and there is almost no vibration, the posture variation of the vehicle 200 is detected and the correction amount c does not become zero. For this reason, the display position (=reference position P0+correction amount c) of the virtual image Iv changes, and may move away from, for example, the position P2 where it displays the image. In the present embodiment, in order to reduce a position displacement E caused by the noise of the sensor, the correction amount c is reset to zero when the angular velocity is larger than the first threshold a, as described later. In this manner, it is possible to suppress the accumulation of correction errors due to the drift of the gyro sensor 41.

3. Operation of Display Processing Device

Figure 11:
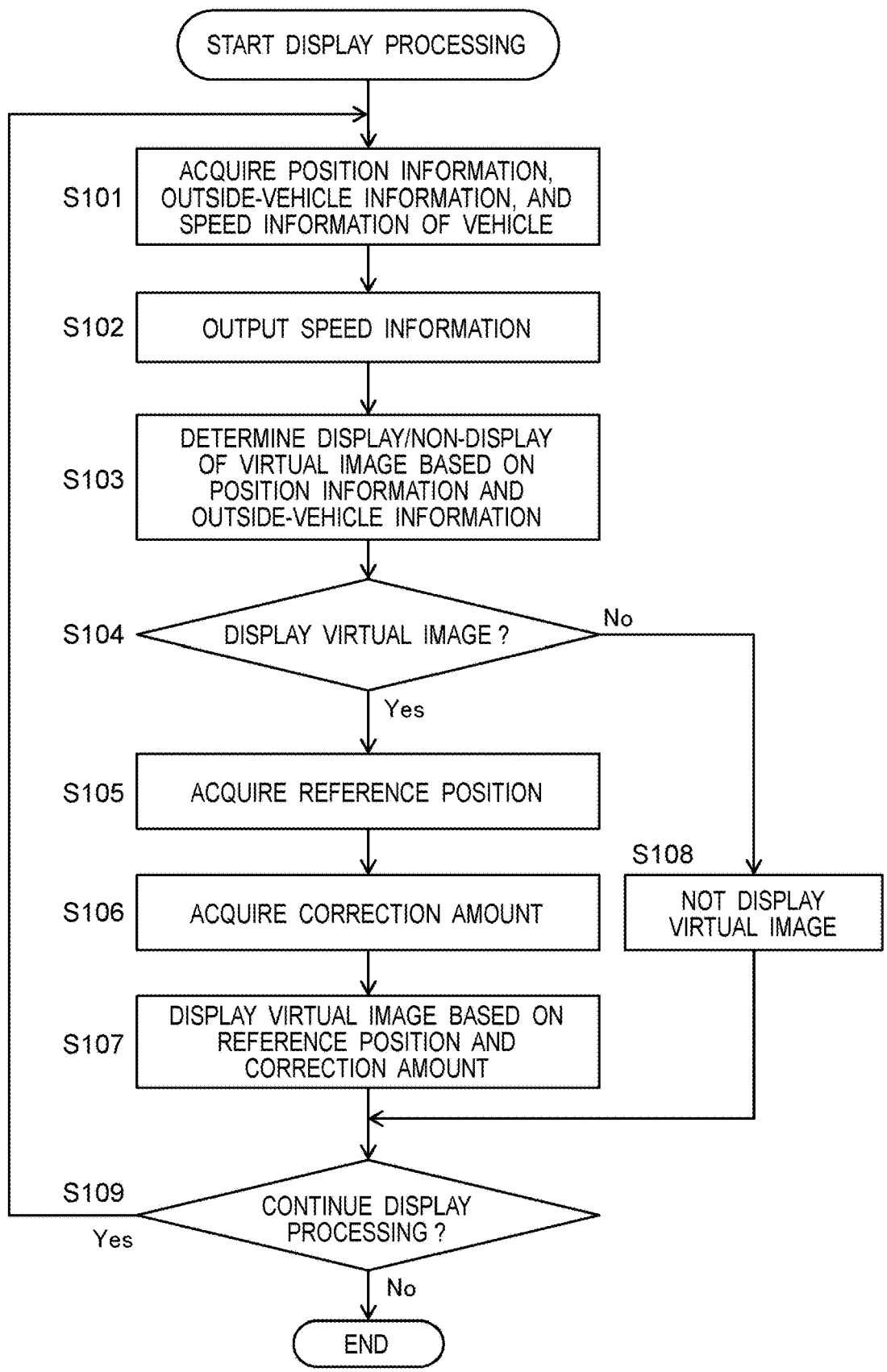
FIG. 11 is a flowchart showing display processing in the first embodiment.

The operation of the display controller 32 of the display processing device 30 will be described with reference to FIG. 11. FIG. 11 shows the display processing performed by the display controller 32 of the display processing device 30. The display processing shown in FIG. 11 is started, for example, when the engine of the vehicle 200 is started or when a button for instructing the start of displaying the virtual image Iv is operated.

The display controller 32 acquires the position information, the outside-vehicle information, and the speed information of the vehicle 200 from the information acquisition device 20 (S101). The display controller 32 outputs the speed information to the correction processing device 50 (S102). The display controller 32 determines whether or not to display the virtual image Iv corresponding to the display target based on the position information and the outside-vehicle information (S103).

In a case of determining to display the virtual image Iv (Yes in S104), the display controller 32 acquires information indicating the reference position P0 of the virtual image Iv from an external device (S105). The display controller 32 acquires information indicating the correction amount c of the display position output from the correction processing device 50 (S106). The display controller 32 causes the projection device 10 to display the virtual image Iv based on the reference position P0 and the correction amount c (S107). For example, the display controller 32 reads the image data 330 of the virtual image Iv corresponding to the display target from the storage 33, sets the display position of the virtual image Iv to "reference position P0+correction amount c", and outputs the image data 330 and information indicating the display position to the projection device 10.

In a case of determining not to display the virtual image Iv (No in S104), the display controller 32 hides the virtual image Iv (S108). For example, the display controller 32 outputs a command to stop the display of the virtual image Iv to the projection device 10.

The display controller 32 determines whether or not to continue the display processing (S109). For example, the display controller 32 ends the display processing when the engine of the vehicle 200 is stopped or when a button for giving an instruction to end the display of the virtual image Iv is operated. In this case, the display controller 32 stops the display of the virtual image Iv by the projection device 10. In a case where the display processing is continued, the processing returns to Step S101.

4. Operation of Correction Processing Device

Figure 12:
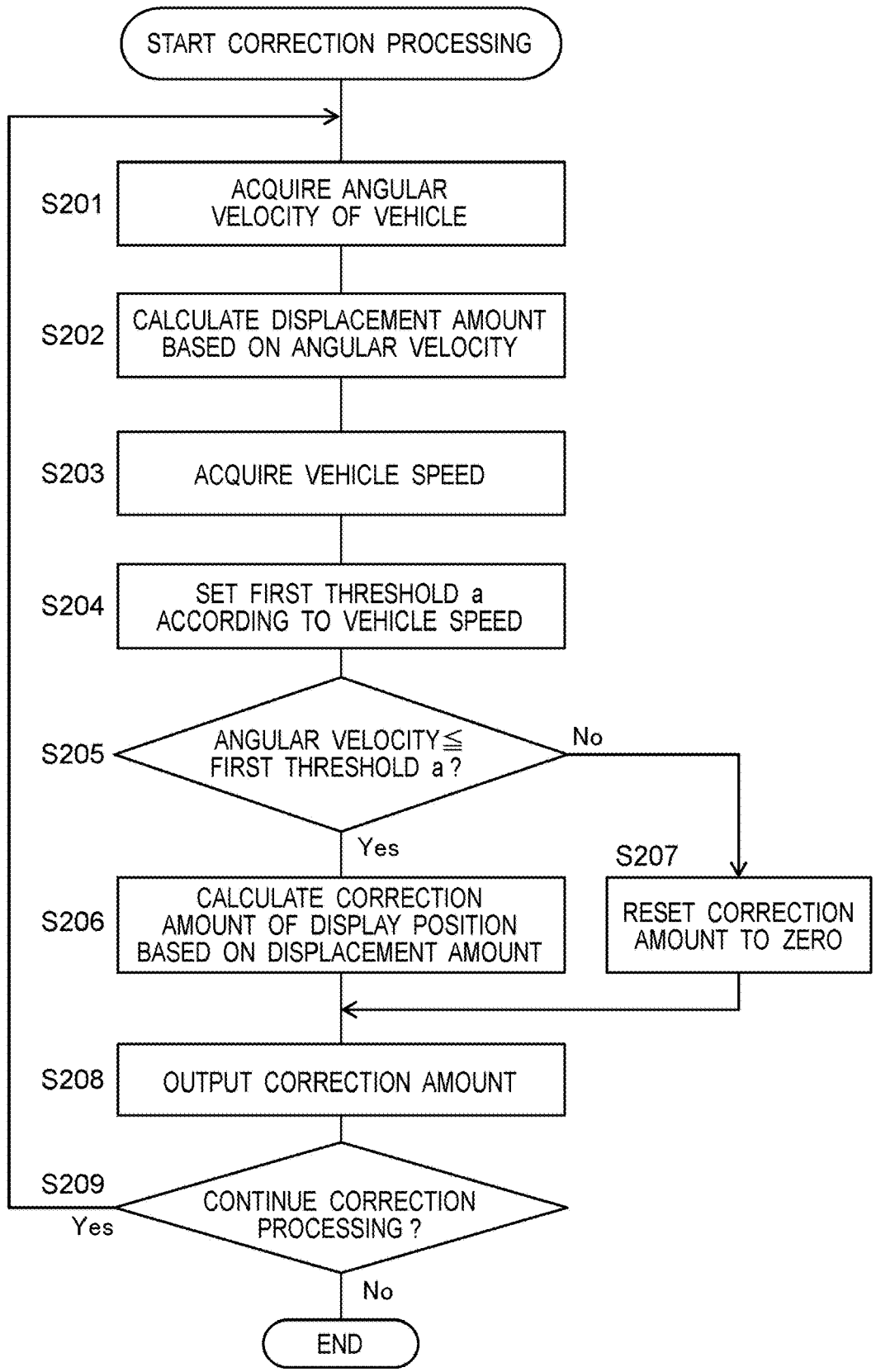
FIG. 12 is a flowchart showing correction processing in the first embodiment.
Figure 13A:
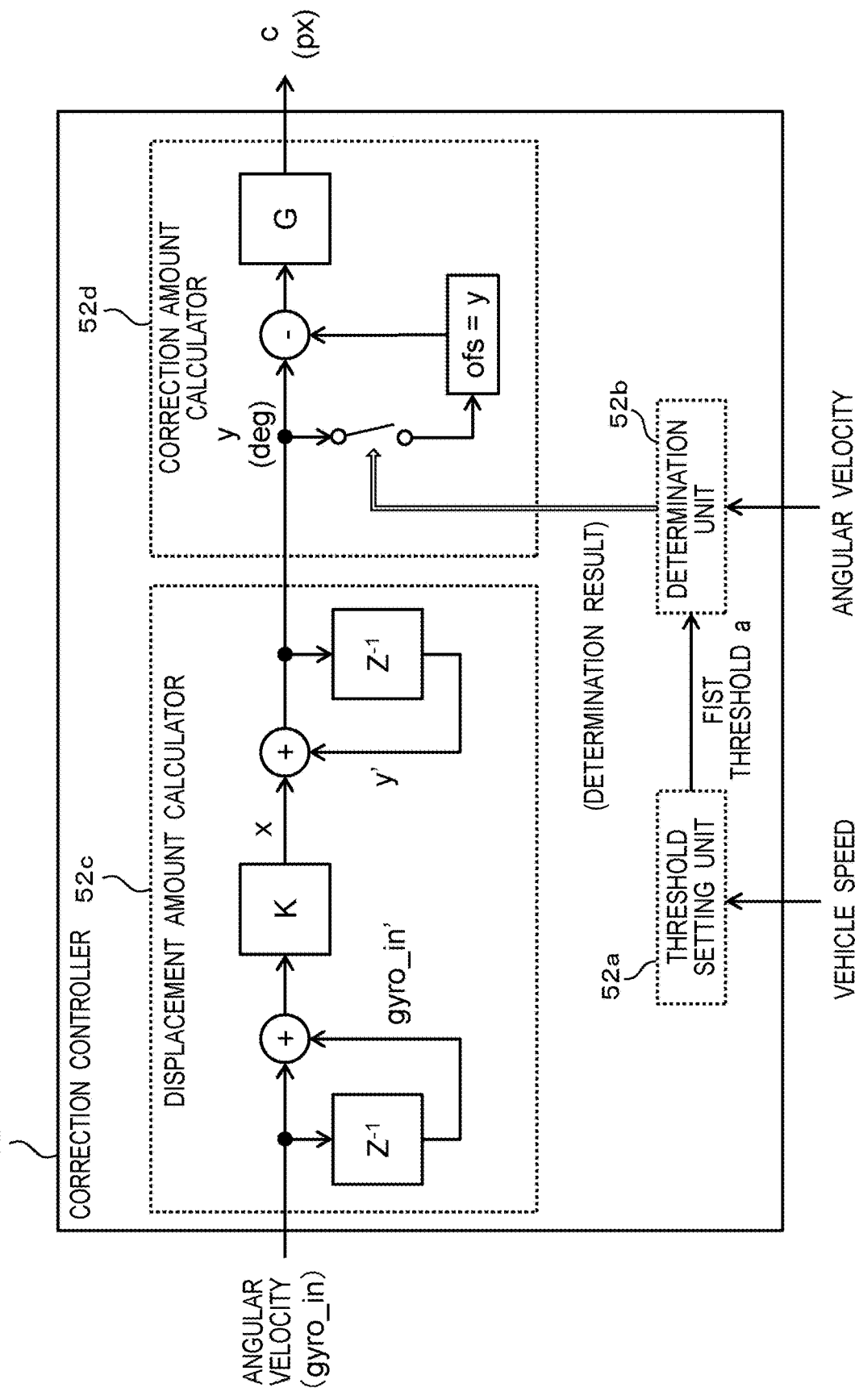
FIG. 13A is a diagram for explaining resetting of a correction amount in the first embodiment.

Operation of the correction controller 52 of the correction processing device 50 according to the first embodiment will be described with reference to FIGS. 12 and 13A. FIG. 12 shows the correction processing performed by the correction controller 52 of the correction processing device 50. FIG. 13A shows a functional configuration of the correction controller 52 in the first embodiment.

The correction processing shown in FIG. 12 is started, for example, when the engine of the vehicle 200 is started or when a button for instructing the start of displaying the virtual image Iv is operated. The correction processing of FIG. 12 is started, for example, together with the display processing of FIG. 11. Note that the correction processing shown in FIG. 12 may be started when the button for instructing the start of the position correction of the virtual image Iv is operated.

The correction controller 52 acquires the angular velocity information indicating the angular velocity of the vehicle 200 output from the gyro sensor 41 (S201). The displacement amount calculator 52c calculates a displacement amount of the vehicle 200 with respect to the three axes based on the angular velocity (S202). For example, as shown in FIG. 13A, the displacement amount calculator 52c calculates a current displacement amount y from "y=y'+x". The displacement amount y is an angle with respect to the three axes. In FIG. 13A, y' is a previous displacement amount, and x is a calculated value in an integration calculation process. The calculated value x is calculated from "x=(gyro_in+ gyro_in')×K". K is a filter coefficient. gyro_in is the angular velocity acquired in Step S201, and gyro_in' is a previous angular velocity.

The threshold setting unit 52a acquires the speed information indicating the vehicle speed from the display processing device 30 (S203). The threshold setting unit 52a sets the first threshold a corresponding to the vehicle speed based on the threshold data 530 stored in the storage 53 and the speed information acquired in Step S203 (S204). The determination unit 52b determines whether or not the angular velocity acquired in Step S201 is equal to or less than the first threshold a (S205).

In a case where the determination unit 52b determines that the angular velocity is equal to or less than the first threshold a (Yes in S205), the correction amount calculator 52d calculates the correction amount c of the display position of the virtual image Iv based on the current displacement amount y (S206). In a case where the determination unit 52b determines that the angular velocity is larger than the first threshold a (No in S205), the correction amount calculator 52d resets the correction amount c to zero (S207).

For example, in Step S206, as shown in FIG. 13A, the correction amount calculator 52d calculates the correction amount c from "c=(y−ofs)×G". Here, G is a conversion coefficient for converting an angle into the number of pixels. Specifically, for example, the correction amount calculator 52d converts the displacement amount, which is the angle of the vehicle 200, into the number of pixels for the pitch angle and the yaw angle, and determines the correction amount c that cancels the displacement amount indicated by the number of pixels. For the roll angle, the correction amount c that cancels the displacement amount is determined while the roll angle is kept as an angle. An initial value of the offset value ofs is, for example, zero.

For example, when the correction amount c is reset to zero in Step S207, the correction amount calculator 52d sets the current displacement amount y as the offset value ofs (ofs=y). That is, the offset value ofs is the displacement amount y when the angular velocity is larger than the first threshold a. In this manner, the calculation of the correction amount c, "c=(y−ofs)×G", in the correction amount calculator 52d becomes "c=0×G" from "ofs=y". Therefore, the correction amount c calculated by the correction amount calculator 52d becomes zero.

The correction amount calculator 52d outputs the correction amount c calculated in Step S206 or the correction amount c calculated in Step S207 to the display processing device 30 (S208).

The correction controller 52 determines whether or not to continue the correction processing (S209). In a case where the correction processing is continued (Yes in S209), the processing returns to Step S201. In a case where the correction processing is not continued (No in S209), the processing shown in FIG. 12 is finished.

5. Effect, Supplement, and the Like

The display system 100 of the present disclosure includes the information acquisition device 20, the posture detection device 40, the display processing device 30, and the correction processing device 50. The information acquisition device 20 acquires the speed information indicating a speed of the moving body. The posture detection device 40 detects a posture variation amount of the moving body. The display processing device 30 controls the display position of the image based on the reference position and the correction amount. The correction processing device 50 sets the correction amount c based on the speed and the posture variation amount. Specifically, the correction processing device 50 sets the first threshold a based on the speed. The correction processing device 50 sets the correction amount c based on the posture variation amount during a period in which the posture variation amount is equal to or less than the first threshold a. The display processing device 30 returns the display position to the reference position P0 during a period in which the posture variation amount is larger than the first threshold a.

Specifically, the posture variation amount is the angular velocity of the moving body. The display system 100 of the present embodiment further includes the projection device 10 that projects light representing an image. In the present embodiment, the moving body is the vehicle 200, and the image is a virtual image displayed in front of the windshield of the vehicle 200.

Figure 4B:
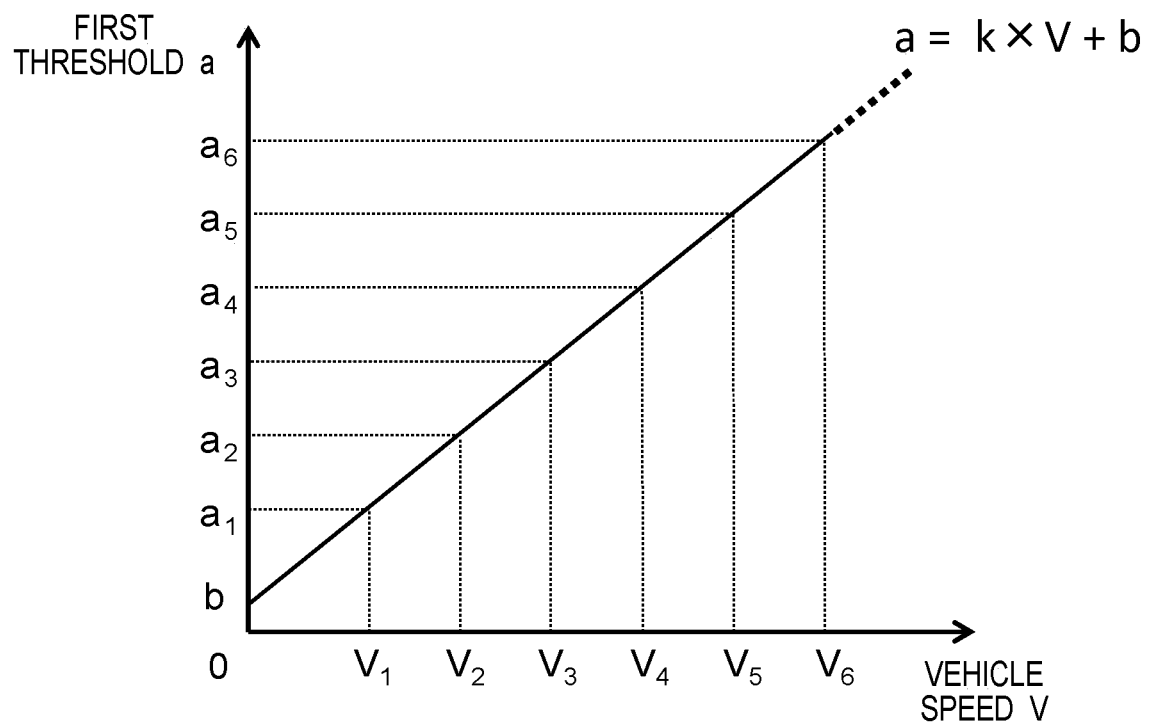
FIG. 4B is another graph showing a threshold according to vehicle speed.

Since the threshold setting unit 52a of the correction processing device 50 changes the magnitude of the first threshold a according to the vehicle speed, it is possible to accurately suppress the position displacement of the image. Specifically, the threshold setting unit 52a sets the first threshold a so that the first threshold a increases as the vehicle speed increases, as shown in FIGS. 4A and 4B. This makes it possible to determine (estimate) a vibration amplitude (displacement amount) based on the vehicle speed and the posture variation amount. When the vibration amplitude is within the correction range, the position displacement correction is performed, and, when there is a large change in the outside view in a case where the vibration amplitude exceeds the correction range and the position displacement correction cannot be performed, resetting for eliminating the accumulated error of the correction value is performed. In this manner, the position displacement correction of the image with high accuracy that achieves both the elimination of the accumulated error and the appearance quality can be performed while the accuracy of the position displacement correction is maintained. For example, even in a case where the vehicle 200 travels at a low speed and a vibration frequency is low, the display position can be returned to the reference position. Further, even in a case where the vehicle 200 travels at a high speed and the vibration frequency is high, the display position can be changed by the correction amount based on the angular velocity. By changing the display position based on the angular velocity, it is possible to accurately suppress the position displacement of the image due to the posture variation of the moving body. Further, by returning the display position to the reference position, it is possible to reduce the accumulation of the correction error and suppress the position displacement of the image due to the accumulation of the correction error. According to the present embodiment, since the first threshold a is set according to the vehicle speed, both the correction based on the angular velocity and the resetting of the correction error can be accurately achieved according to the traveling speed. Even if the display position is returned to the reference position when the displacement amount of the display position of the image becomes large, the viewer does not feel uncomfortable with the change of the display position of the image.

Specifically, the correction processing device 50 resets the correction amount c to zero when the angular velocity is larger than the first threshold a. More specifically, the correction processing device 50 includes the displacement amount calculator 52c and the correction amount calculator 52d. The displacement amount calculator 52c corresponds to a first calculator that calculates the angle of the moving body from the angular velocity. The correction amount calculator 52d corresponds to a second calculator that converts the angle into the number of pixels and calculates the correction amount c.

For example, the angular velocity detected by the gyro sensor 41 includes an error due to drift. Therefore, if the calculation of the correction amount c based on the integral calculation of the angular velocity is continued, the error included in the correction amount c is accumulated and becomes large. However, in the present embodiment, the correction amount c is reset to zero by setting the displacement amount y as the offset value ofs when the angular velocity is larger than the first threshold a. In this manner, the display position of the virtual image Iv is reset to the reference position P0 when the angular velocity is larger than the first threshold a. Therefore, the error in the display position due to accumulation of noise of the gyro sensor 41 used for detecting the vehicle posture can be eliminated when the angular velocity is larger than the first threshold a. In this manner, the display position of the virtual image Iv can be returned to the position where it displays the image. The correction amount c when the angular velocity is equal to or less than the first threshold a is calculated by "c=(y−ofs)×G". By setting the offset value ofs to the displacement amount y when the angular velocity is larger than the first threshold a, the accumulation of the correction error due to the noise of the gyro sensor 41 after that is suppressed.

Figure 13B:
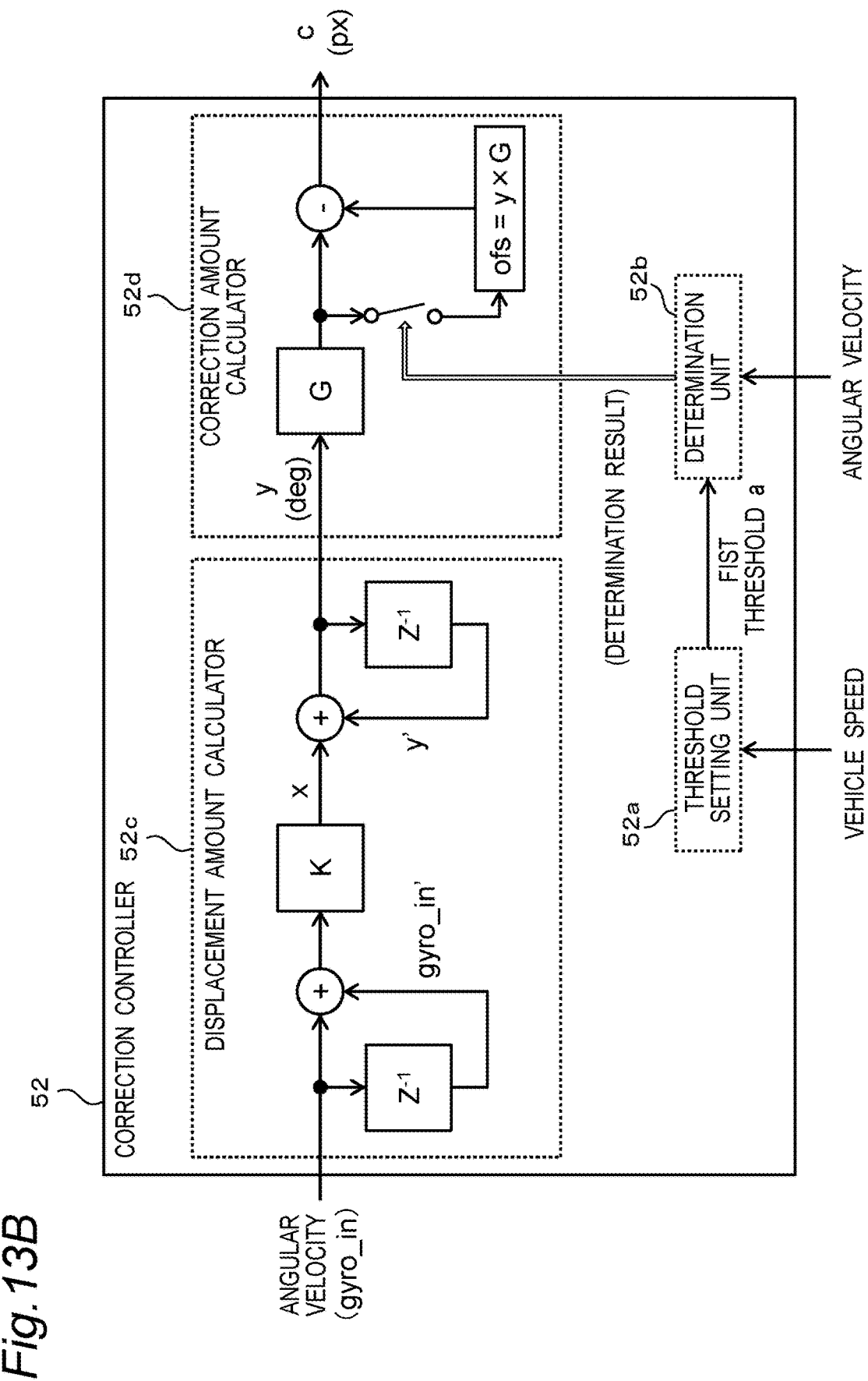
FIG. 13B is a diagram for explaining another example of resetting of a correction amount in the first embodiment.

Although the offset value ofs is an angle in FIG. 13A, the offset value ofs may also be the number of pixels. FIG. 13B shows another example of the functional configuration of the correction controller 52 in the first embodiment. For example, as shown in FIG. 13B, the correction amount calculator 52d calculates the correction amount c from "c=y×G−ofs". In this case, the correction amount calculator 52d sets "y×G" as the offset value ofs (ofs=y×G) when the angular velocity is larger than the first threshold a. In this manner, the correction amount c when the angular velocity is larger than the first threshold a may be reset to zero.

Second Embodiment

In the first embodiment, the correction amount calculator 52d of the correction processing device 50 outputs the correction amount c adjusted by the offset value ofs, and the display processing device 30 sets the display position of the virtual image Iv to the "reference position P0+correction amount c". In the present embodiment, the correction amount calculator 52d outputs the correction amount c and the offset value ofs. That is, in the present embodiment, the correction amount c is not adjusted by the offset value ofs. The display processing device 30 sets the display position of the virtual image Iv to "reference position P0+offset value ofs+correction amount C".

Figure 14:
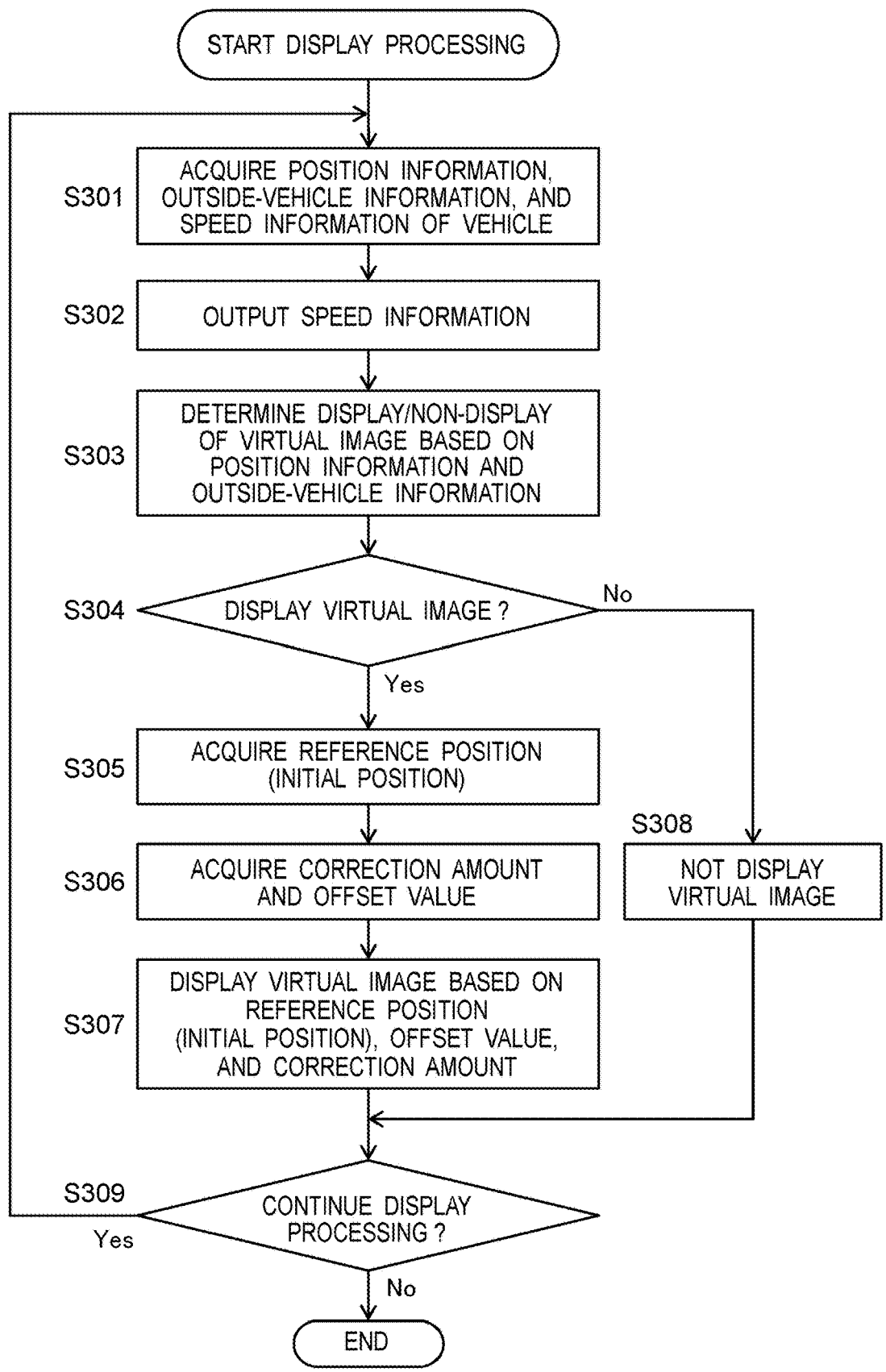
FIG. 14 is a flowchart showing the display processing in a second embodiment.

FIG. 14 shows the display processing performed by the display controller 32 of the display processing device 30. Steps S301 to S305, S308, and S309 of FIG. 14 of a second embodiment are the same as Steps S101 to S105, S108, and S109 of FIG. 11 of the first embodiment.

In the present embodiment, when displaying the virtual image, the display controller 32 acquires the offset value ofs together with the correction amount c from the correction processing device 50 (S306). The display controller 32 causes the projection device 10 to display the virtual image Iv based on the reference position P0, the offset value ofs, and the correction amount c (S307). Specifically, the display controller 32 sets a new reference position P0' from "P0'=P0+ofs" from the reference position P0 and the offset value ofs. The reference position P0 before being adjusted by the offset value ofs is also referred to as an initial position. The offset value ofs corresponds to a shift amount from the initial position. The display controller 32 sets the display position of the virtual image Iv to "new reference position P0'+correction amount c" and causes the projection device 10 to display the virtual image Iv.

Figure 15:
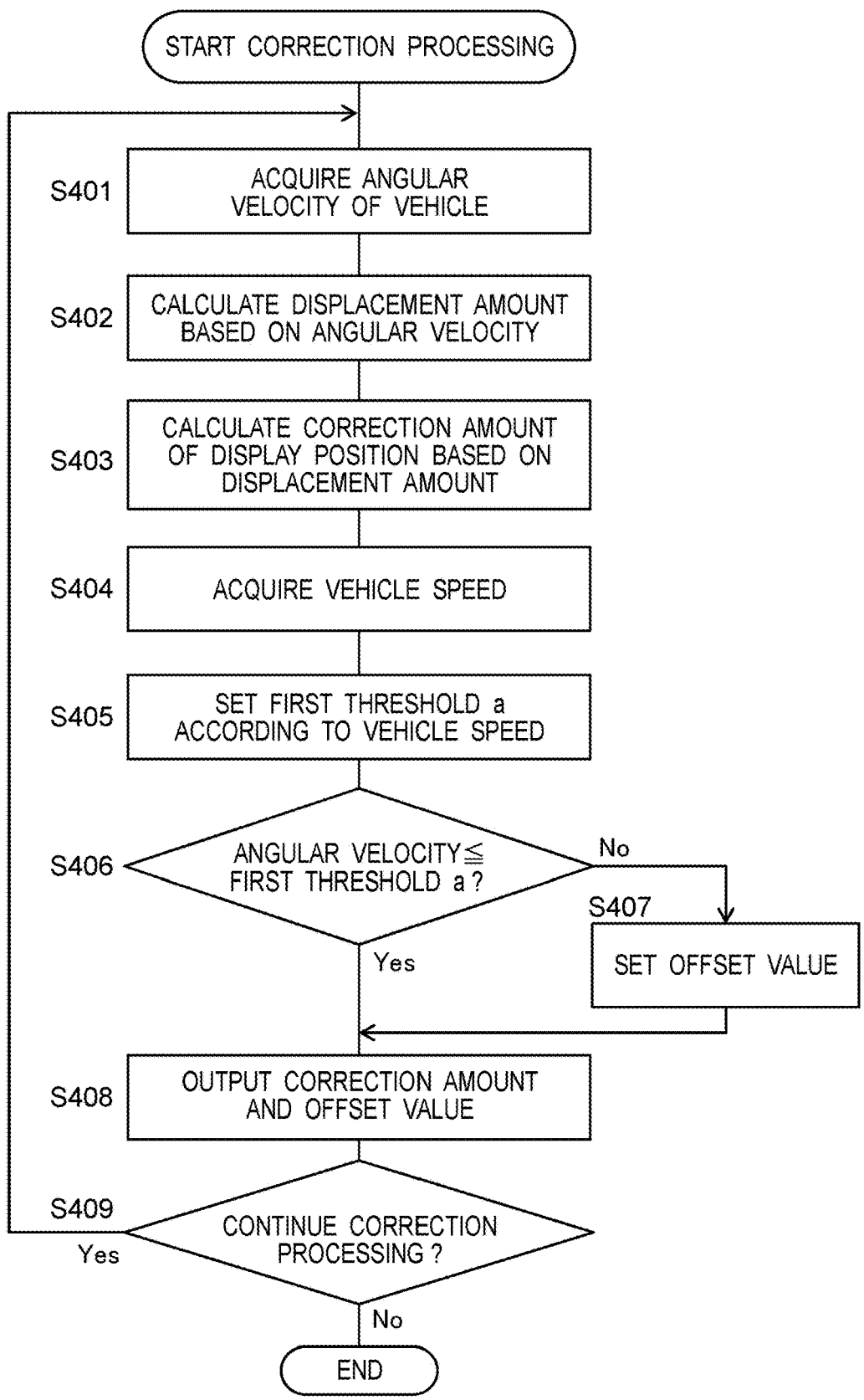
FIG. 15 is a flowchart showing the correction processing in the second embodiment.
Figure 16:
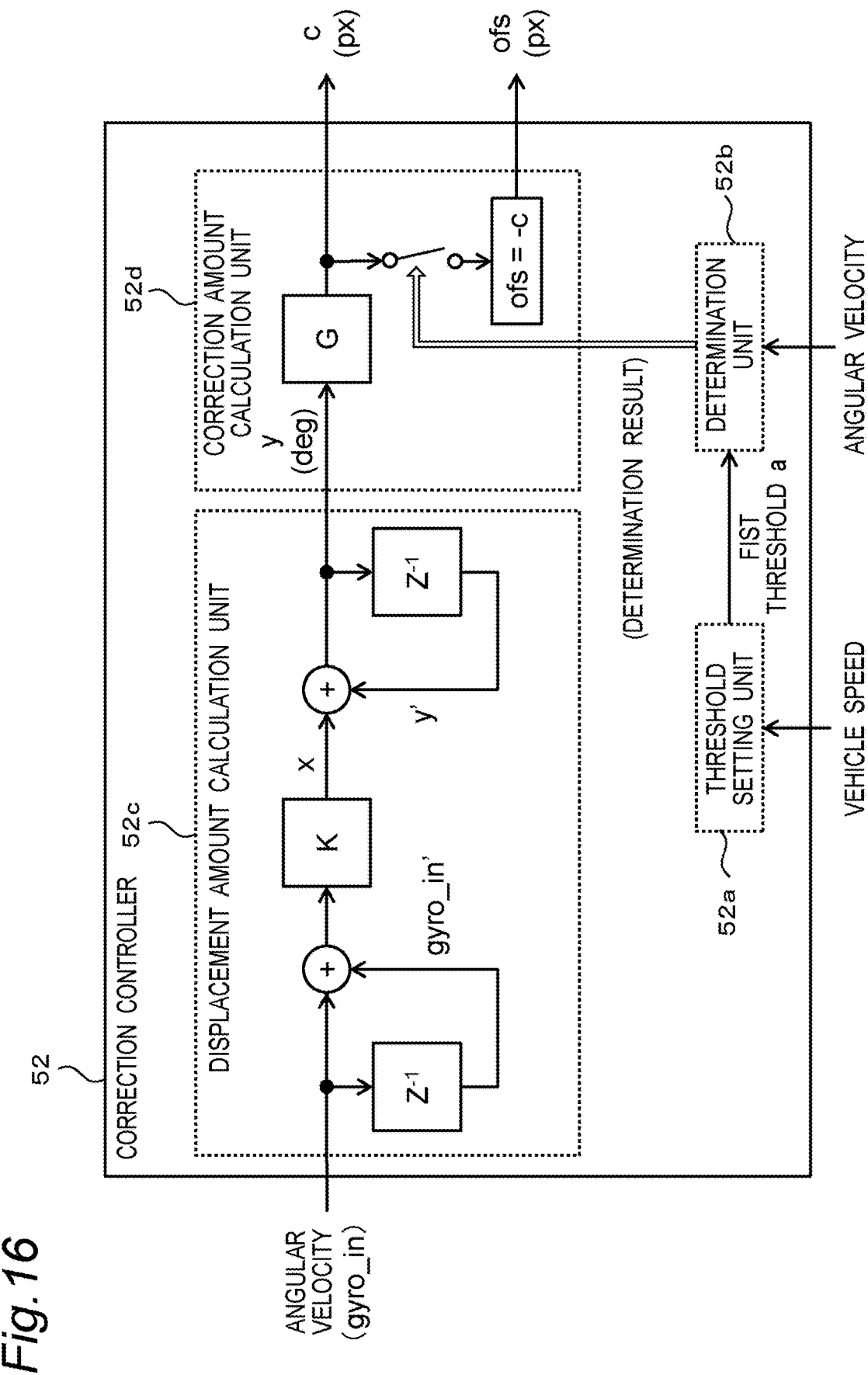
FIG. 16 is a diagram for explaining setting of an offset value in the second embodiment.

The operation of the correction controller 52 of the correction processing device 50 according to the second embodiment will be described with reference to FIGS. 15 and 16. FIG. 15 shows the correction processing performed by the correction controller 52 of the correction processing device 50. Steps S401, S402, S404 to S406, and S409 of FIG. 15 of the second embodiment are the same as Steps S201 to S205, and S209 of FIG. 12 of the first embodiment. FIG. 16 shows the functional configuration of the correction controller 52 in the second embodiment.

In the present embodiment, the correction amount calculator 52d calculates the correction amount c from "c=y×G" based on the displacement amount y (S403).

The correction amount calculator 52d sets the offset value ofs based on the correction amount c when the angular velocity is larger than the first threshold a (ofs=−c) (S407). The offset value ofs in the present embodiment corresponds to the number of pixels. An initial value of the offset value ofs is, for example, zero.

The correction amount calculator 52d outputs the correction amount c calculated in Step S403 and the offset value ofs set in Step S407 to the display processing device 30 (S408).

As described above, in the present embodiment, the display processing device 30 controls the display position of the image based on the reference position P0, the offset value ofs, and the correction amount c. The correction processing device 50 sets the offset value ofs based on the correction amount c of when the angular velocity is larger than the first threshold a.

By setting the offset value ofs based on the correction amount c of when the angular velocity is larger than the first threshold a, the display position based on the new reference position P0' (=P0+ofs) and the correction amount c by the display controller 32 is substantially the same as the display position of the first embodiment. Therefore, according to the present embodiment, an effect that is the same as that of the first embodiment can be obtained.

Third Embodiment

In the first embodiment, the correction controller 52 resets the correction amount c to zero when the angular velocity is larger than the first threshold a. In the present embodiment, the correction controller 52 reduces the magnitude of the correction amount c by a predetermined amount when the angular velocity is larger than the first threshold a.

Figure 17:
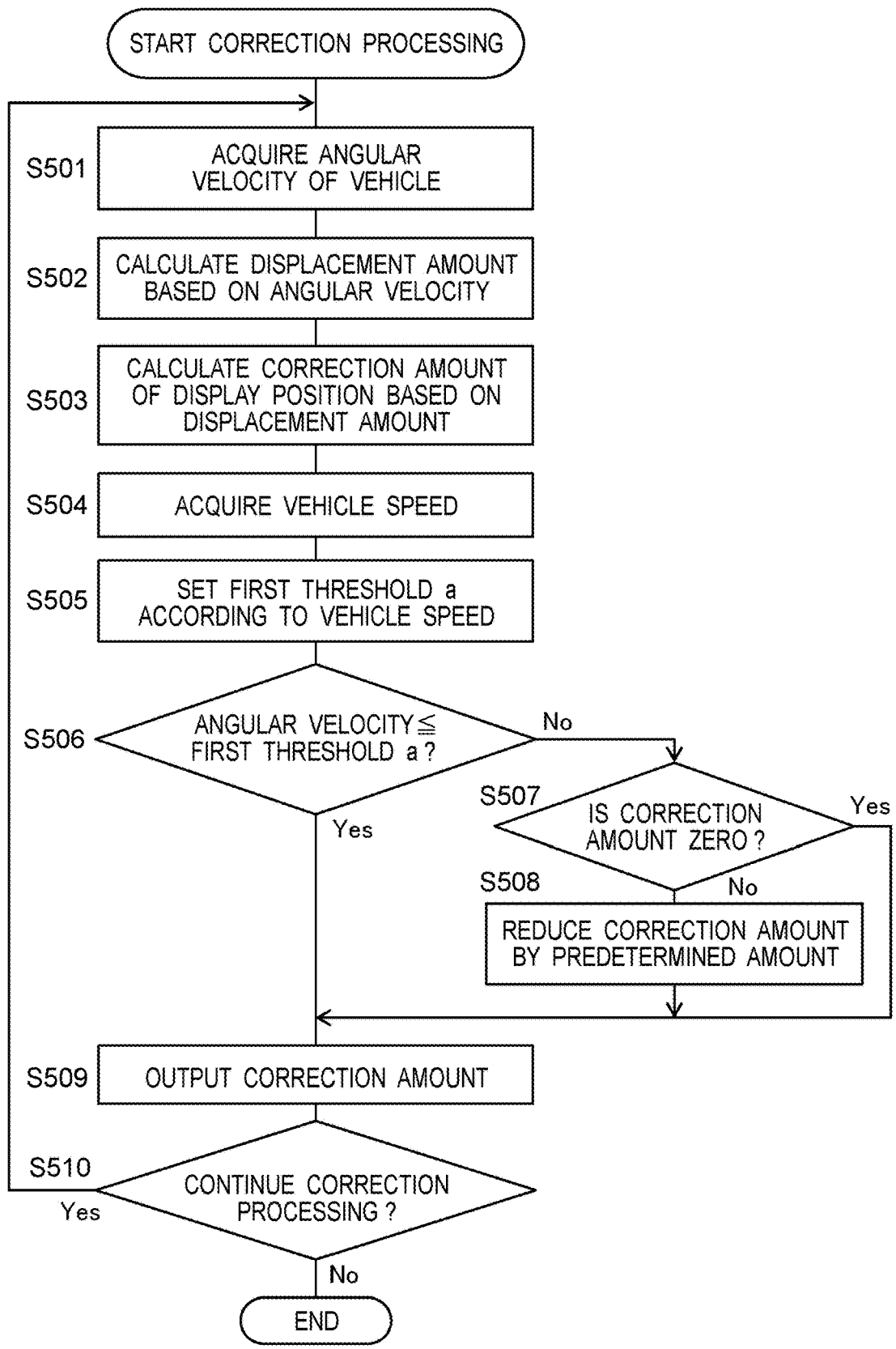
FIG. 17 is a flowchart showing correction processing in a third embodiment.

FIG. 17 shows correction processing performed by the correction controller 52 of the correction processing device 50 in a third embodiment. Steps S501, S502, S504 to S506, S509, and S510 of FIG. 17 of the third embodiment are the same as Steps S201 to S205, S208, and S209 of FIG. 12 of the first embodiment.

The correction controller 52 calculates the correction amount c of the display position of the virtual image Iv from, for example, "c=y×G" based on the displacement amount y (S503). In a case where the determination unit 52b determines that the angular velocity is equal to or less than the first threshold a (Yes in S506), the correction amount calculator 52d outputs the correction amount c calculated in Step S503 (S509).

In a case where the determination unit 52b determines that the angular velocity is larger than the first threshold a (No in S506), the correction amount calculator 52d determines whether or not the correction amount c calculated in Step S503 is zero (S507). Note that the determination unit 52b may determine whether or not the correction amount c is zero.

If the correction amount c is not zero (No in Step S507), the correction amount calculator 52d reduces the magnitude of the correction amount c by a predetermined amount so that the correction amount c approaches zero (S508). For example, the correction amount calculator 52d subtracts a predetermined amount $q_{px}$ from the correction amount c calculated in Step S503, and outputs "c−$q_{px}$" in Step S509. In another example, the correction amount calculator 52d may subtract a predetermined amount $q_{deg}$ from the displacement amount y and calculate the correction amount c from "c=(y−$q_{deg}$)×G". In yet another example, the correction amount calculator 52d may set the predetermined amount $q_{deg}$ as the offset value ofs in the calculation of the correction amount c shown in FIG. 13A. The correction amount calculator 52d may set the predetermined amount $q_{px}$ as the offset value ofs in the calculation of the correction amount c shown in FIG. 13B. The predetermined amounts $q_{px}$ and $q_{deg}$ may be set according to the magnitude of the displacement amount y or the correction amount c. For example, the predetermined amount $q_{px}$ is set to a value smaller than the correction amount c so that the correction amount c becomes a value larger than zero. The magnitude of the predetermined amounts $q_{px}$ and $q_{deg}$ may be set according to the display position of the virtual image Iv in the display area 220. If the correction amount c is zero (Yes in Step S507), the processing proceeds to Step S509 without executing Step S508.

The correction amount calculator 52d outputs the correction amount c calculated in Step S503 or the correction amount c calculated in Step S508 to the display processing device 30 (S509).

As described above, the correction processing device 50 calculates the correction amount c for each sampling cycle of the correction processing, and reduces the correction amount c by a predetermined amount when the angular velocity is larger than the first threshold a. In this manner, the correction amount is reduced by a certain amount while the correction amount is updated, so that the position of the virtual image Iv does not abruptly change significantly. Therefore, it is possible to prevent the occupant D from feeling uncomfortable with the change in the display position of the virtual image Iv. That is, it is possible to suppress a feeling of uncomfortableness due to the shift of the display position. Furthermore, the accumulated error can be suppressed.

Fourth Embodiment

When the angular velocity is larger than the first threshold a, the correction amount c is reset to zero in the first embodiment, and the magnitude of the correction amount c is reduced by a certain amount in the third embodiment. In the present embodiment, the correction amount c is adjusted according to the magnitude of the correction amount c calculated from the displacement amount. Specifically, in a case where the correction amount c is equal to or more than a second threshold b, the correction amount c is reduced by a predetermined amount, and when the correction amount c is less than the second threshold b, the correction amount c is reset to zero. The second threshold b is a threshold for the correction amount c.

Figure 18:
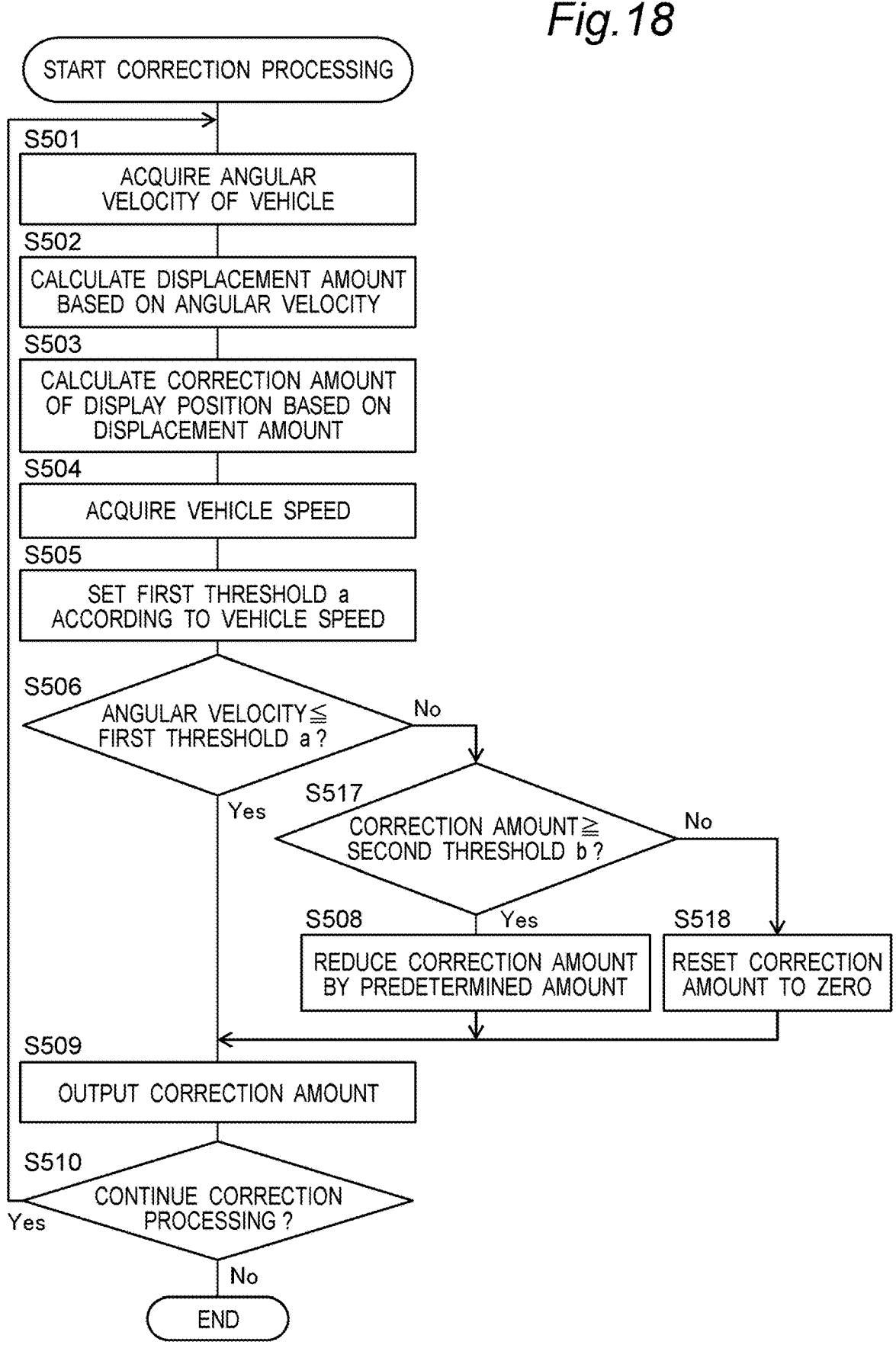
FIG. 18 is a flowchart showing correction processing in a fourth embodiment.

FIG. 18 shows the correction processing in a fourth embodiment. The correction processing shown in FIG. 18 of the fourth embodiment is a combination of the correction processing shown in FIG. 12 of the first embodiment and the correction processing shown in FIG. 17 of the third embodiment.

In the present embodiment, in a case where the angular velocity is larger than the first threshold a (No in S506), the correction amount calculator 52d determines whether or not the correction amount c based on the displacement amount y calculated in Step S503 is equal to or more than the second threshold b (S517). The determination unit 52b may make the determination in Step S517.

If the correction amount c is equal to or more than the second threshold b (Yes in Step S517), the correction amount calculator 52d reduces the correction amount c by a predetermined amount (S508).

If the correction amount c is smaller than the second threshold b (No in Step S517), the correction amount calculator 52d resets the correction amount c to zero (S518).

As described above, the correction processing device 50 calculates the correction amount c for each sampling cycle of the correction processing. In a case where the angular velocity is larger than the first threshold a, the correction processing device 50 reduces the correction amount c by a predetermined amount at a time so that the correction amount c approaches zero when the correction amount c is equal to or more than the second threshold b, and resets the correction amount c to zero when the correction amount c is smaller than the second threshold b. As described above, the correction amount is reduced by a certain amount while the correction amount c is updated, and when reduced to a certain degree, the correction amount c is reset to zero. In this manner, correction of the display amount and elimination of the accumulated error can be performed according to the inclination of the posture of the vehicle 200 without making the appearance unnatural.

Fifth Embodiment

The present embodiment differs from the first embodiment in the method of resetting the correction amount c to zero. In FIGS. 13A and 13B of the first embodiment, the correction amount calculator 52d resets the correction amount c to zero. In the present embodiment, the displacement amount calculator 52c resets the displacement amount y to zero, so as to reset the correction amount c to zero.

Figure 19:
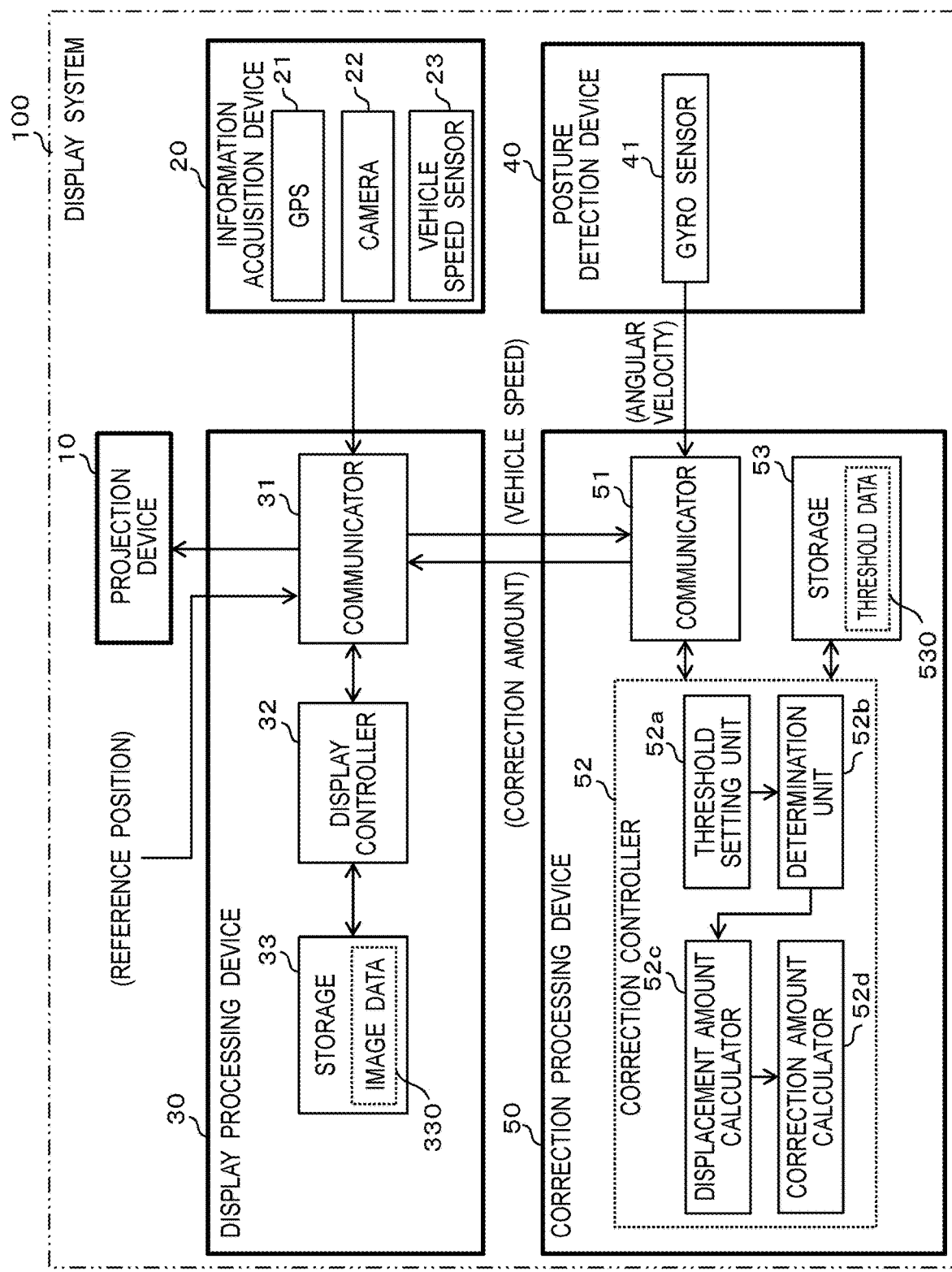
FIG. 19 is a block diagram showing a configuration of a display system according to a fifth embodiment.

FIG. 19 is a block diagram showing an internal configuration of the display system 100 of a fifth embodiment. In the present embodiment, the determination result of the determination unit 52b is output to the displacement amount calculator 52c.

Figure 20:
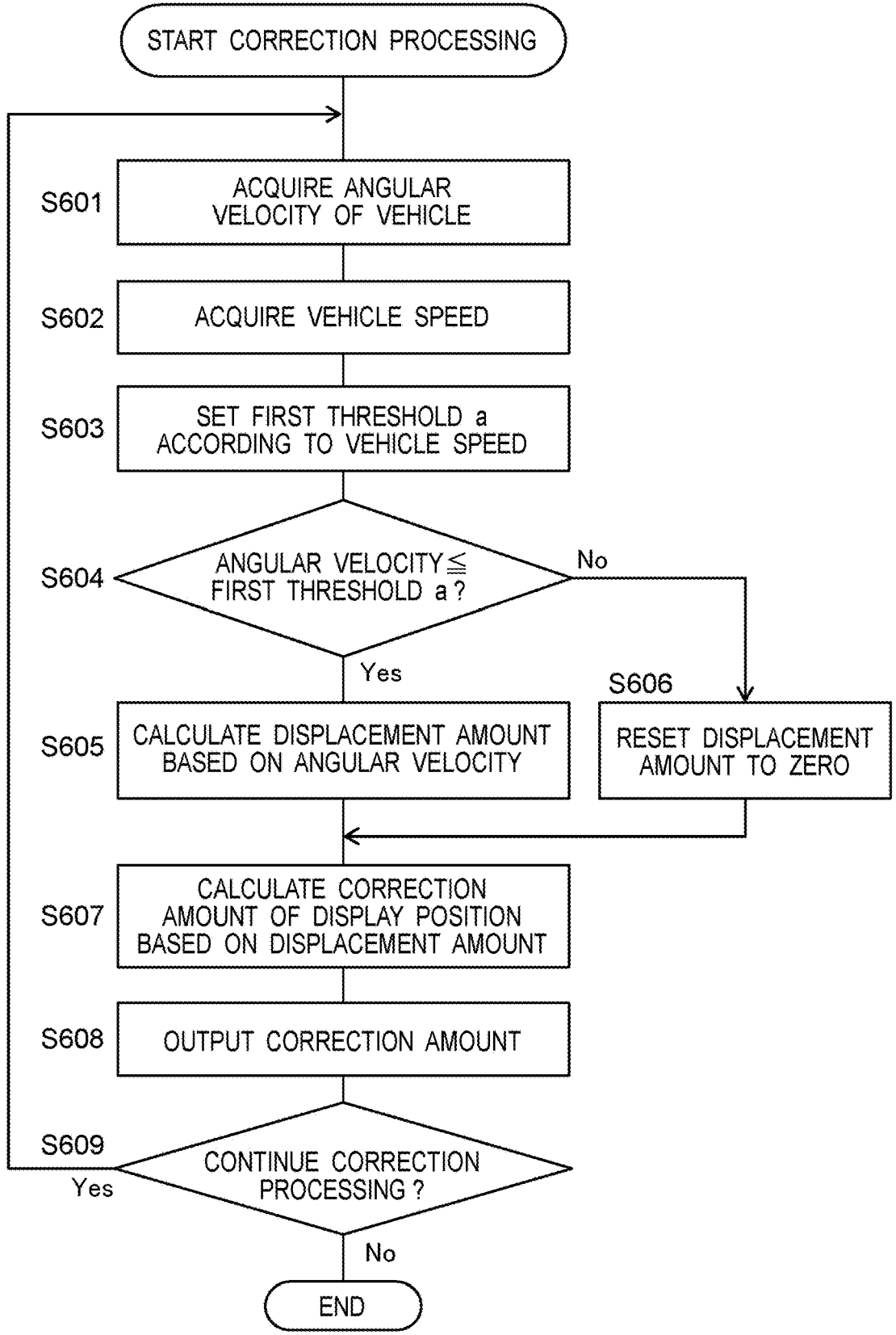
FIG. 20 is a flowchart showing correction processing in the fifth embodiment.
Figure 21A:
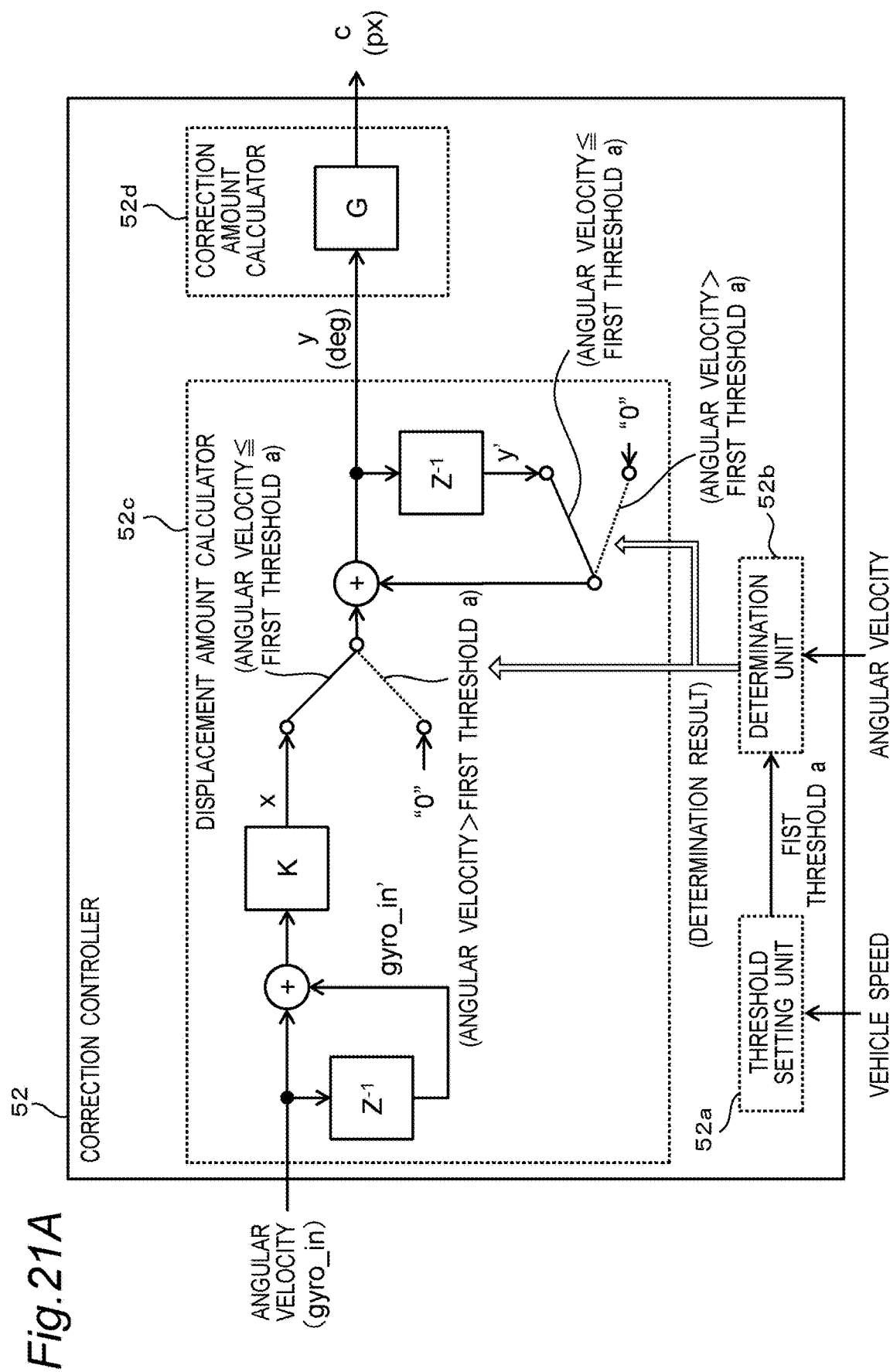
FIG. 21A is a diagram for explaining resetting of a displacement amount in the fifth embodiment.

FIG. 20 shows the correction processing performed by the correction controller 52 of the fifth embodiment. Steps S601 to S605, S608, and S609 of FIG. 20 of the fifth embodiment are the same as Steps S201, S203 to S205, S202, S208, and S209 of FIG. 12 of the first embodiment. FIG. 21A shows a functional configuration of the correction controller 52 of the fifth embodiment.

When the determination unit 52b determines that the angular velocity is equal to or less than the first threshold a (Yes in S604), the displacement amount calculator 52c calculates the displacement amount y from "y=y'+x" based on the angular velocity (S605). In the present embodiment, when the determination unit 52b determines that the angular velocity is larger than the first threshold a (No in S604), the displacement amount calculator 52c resets the displacement amount y to zero (S606).

For example, as shown in FIG. 21A, the displacement amount calculator 52c outputs "y=0" with x=0 and y'=0. By setting "x=0" and "y'=0", an integration filter in the displacement amount calculator 52c is reset. In this manner, the accumulation of the error of the integral calculation in the displacement amount calculator 52c is eliminated.

The correction amount calculator 52d calculates the correction amount c from "c=y×G" based on the displacement amount calculated in Step S605 or Step S606 (S607). When the angular velocity is larger than the first threshold a, zero is output from the displacement amount calculator 52c, and therefore the correction amount calculator 52d calculates "c=0×G". In this manner, the correction amount c is reset to zero.

Figure 21B:
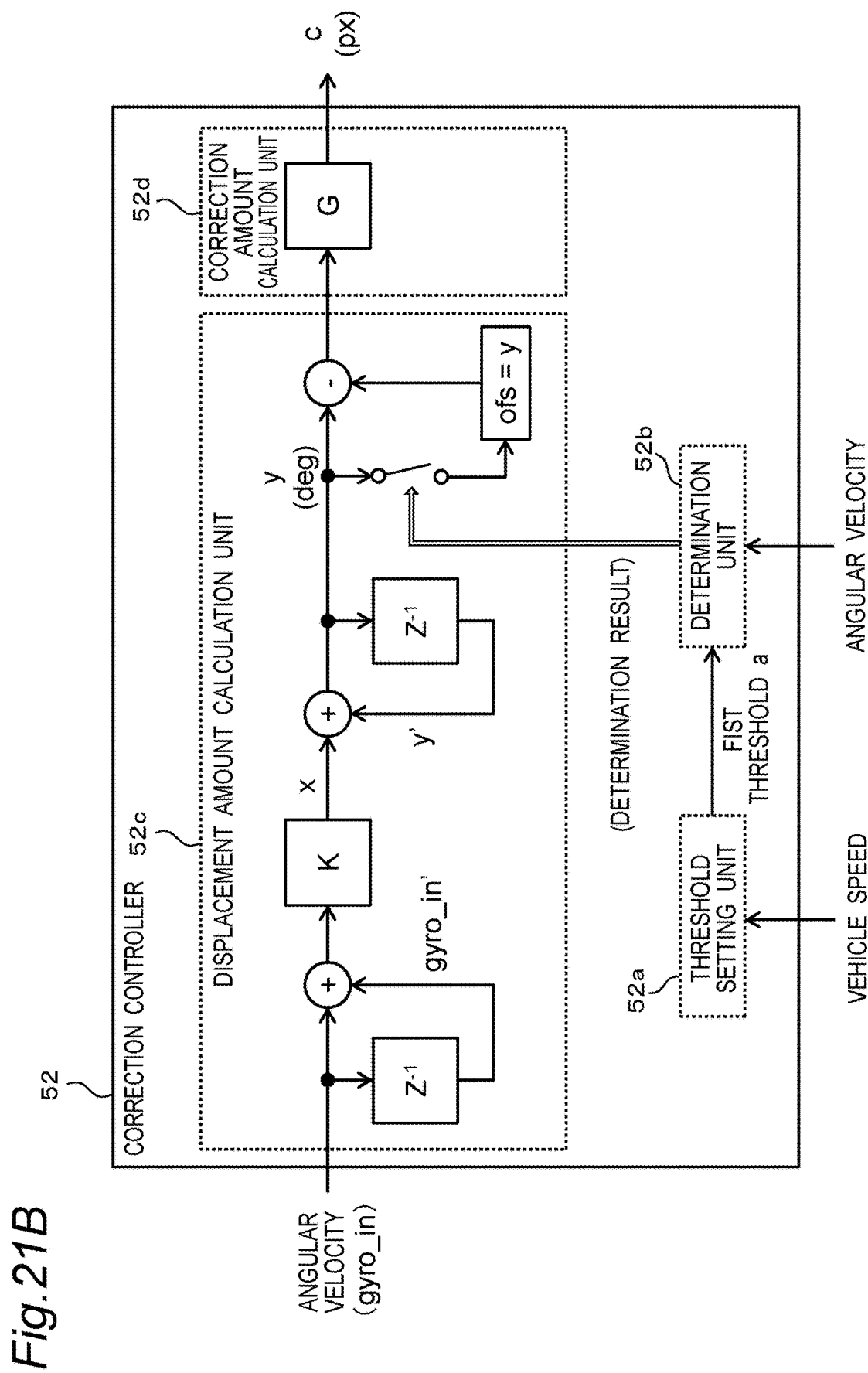
FIG. 21B is a diagram for explaining another example of resetting of a displacement amount in the fifth embodiment.

Note that the displacement amount may be reset to zero by another method. FIG. 21B shows another example of the functional configuration of the correction controller 52 of the fifth embodiment. In this example, the displacement amount calculator 52c outputs a difference "y−ofs" between the displacement amount y and the offset value ofs to the correction amount calculator 52d. The offset value ofs in FIG. 21B is the same as the offset value ofs in FIG. 13A. The displacement amount y when the angular velocity is larger than the first threshold a is set as the offset value ofs (ofs=y). In this manner, the correction amount c when the angular velocity is larger than the first threshold a is reset to zero. By setting the displacement amount y when the angular velocity is larger than the first threshold a as the offset value ofs, the accumulation of the error of the integration calculation in the displacement amount calculator 52c is eliminated.

As described above, in the present embodiment, when the angular velocity is larger than the first threshold a, the displacement amount calculator 52c resets the displacement amount to zero. In this manner, the correction amount c is reset to zero. According to the present embodiment, an effect equivalent to that of the first embodiment can be obtained.

Sixth Embodiment

When the angular velocity is larger than the first threshold a, the correction amount c is reduced by a predetermined amount in the third embodiment. In the present embodiment, from the timing when the angular velocity becomes larger than the first threshold a, the correction amount c is gradually reset to zero over a certain period of time.

Figure 22:
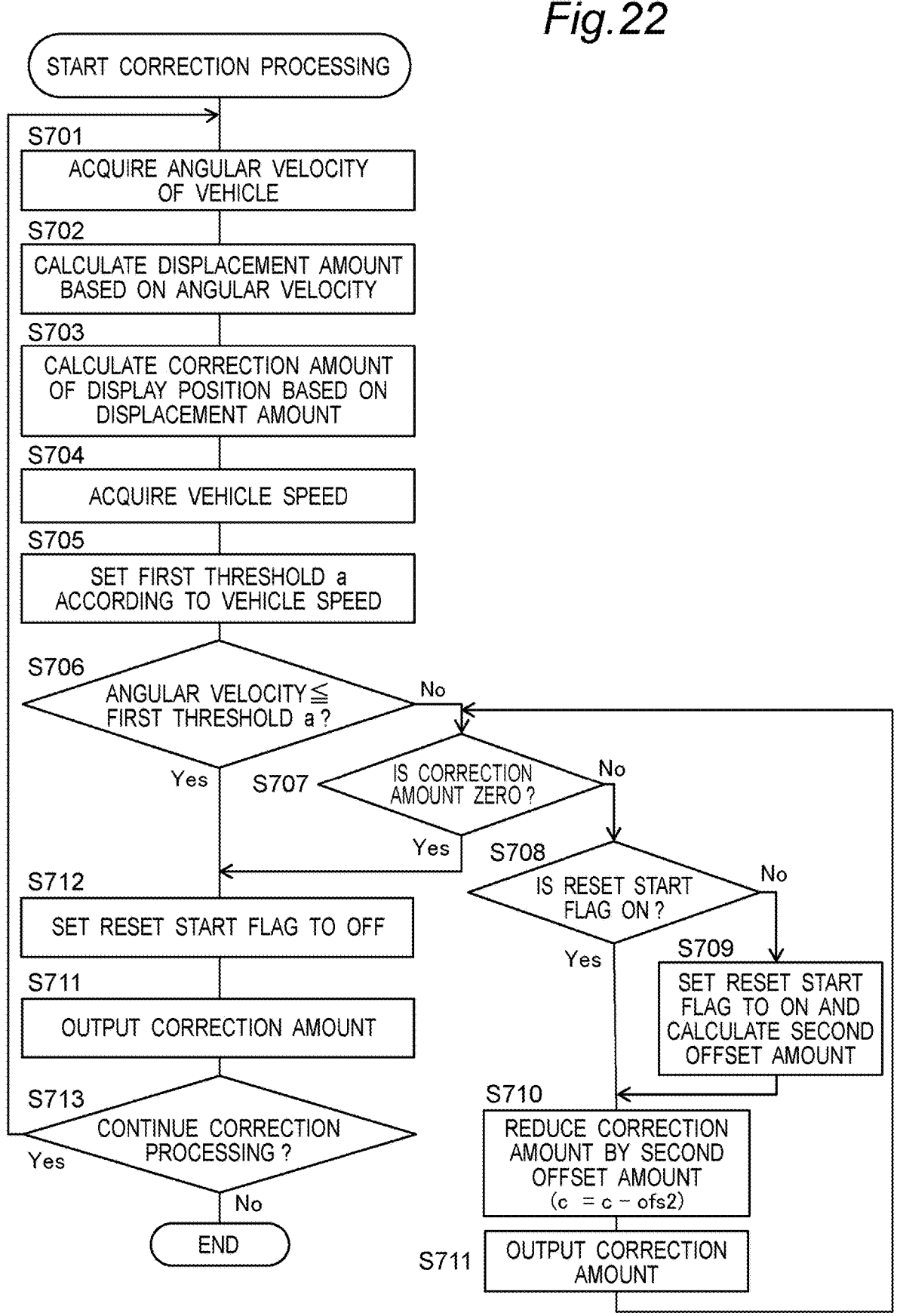
FIG. 22 is a flowchart showing correction processing in a sixth embodiment.

FIG. 22 shows the correction processing in a sixth embodiment. Steps S701 to S707, S711, and S713 of FIG. 22 of the sixth embodiment are the same as Steps S501 to S507, S509, and S510 of FIG. 17 of the third embodiment.

The correction controller 52 calculates the correction amount c of the display position of the virtual image Iv from, for example, "c=y×G" based on the displacement amount y (S703). In a case where the determination unit 52b determines that the angular velocity is equal to or less than the first threshold a (Yes in S706), the correction amount calculator 52d outputs the correction amount c calculated in Step S703 (S711).

In a case where the determination unit 52b determines that the angular velocity is larger than the first threshold a (No in S706), the correction amount calculator 52d determines whether or not the correction amount c calculated in Step S703 is zero (S707). Note that the determination unit 52b may determine whether or not the correction amount c is zero.

In a case where the correction amount calculator 52d determines that the correction amount c is not zero (No in Step S707), the correction amount calculator 52d determines whether or not a reset start flag is set to ON (S708). When the correction amount calculator 52d determines that the reset start flag is not set to ON (No in S708), the correction amount calculator 52d sets the reset start flag to ON and calculates a second offset amount ofs2 (S709). Next, the correction amount calculator 52d reduces the correction amount c by the calculated second offset amount ofs2 (S710). The correction amount calculator 52d outputs the reduced correction amount c to the display processing device 30 (S711).

Next, returning to Step S707, the correction amount calculator 52d again determines whether or not the correction amount c is zero. When the correction amount calculator 52d determines that the correction amount c is not zero (No in S707), the correction amount calculator 52d determines whether or not a reset start flag is set to ON. If the reset start flag is set to ON (Yes in S708), the correction amount c is again reduced by the offset amount ofs2 (S710). In this manner, the correction amount c is gradually reduced.

For example, if the reset start flag is set to ON at a time t1, the correction amount C gradually decreases while the reset start flag is set to ON, and the correction amount becomes zero at a time t4 that is after a reset time Δt1 from the time t1. Note that the configuration may be such that the reset time Δt1 is set in advance, the second offset amount ofs2 in one sampling (one cycle from S707 to S711 in the flowchart) is set to c1×ts/Δt1 from a sampling period ts and a correction amount c1 at the start of resetting, and the correction amount is reduced by c1×ts/Δt1 at a time.

When the correction amount c becomes zero, the correction amount calculator 52d determines that the correction amount c is zero in the determination in Step S707 (Yes in S707), and sets the reset start flag to OFF (S712). The correction amount calculator 52d outputs the correction amount c calculated in Step S703 or the correction amount c which is repeatedly reduced to zero in Steps S704 to S710 to the display processing device 30 (S711).

As described above, the correction processing device 50 gradually reduces the correction amount c over a certain period of time when the angular velocity becomes larger than the first threshold a, so the position of the virtual image Iv gradually returns to the initial position P0. Since the position of the virtual image Iv does not suddenly change significantly, it is possible to prevent the occupant D from feeling uncomfortable with the change in the display position of the virtual image Iv. That is, it is possible to suppress a feeling of uncomfortableness due to the shift of the display position.

Seventh Embodiment

In the case where the angular velocity is larger than the first threshold a, when the correction amount is equal to or more than the second threshold b, the correction amount calculator 52d reduces the correction amount c by a predetermined amount in the fourth embodiment. In the present embodiment, the correction amount c is gradually reduced in a case where the correction amount c is equal to or more than the second threshold b, and the correction amount is reset to zero in a case where the correction amount c is less than the second threshold b.

Figure 23:
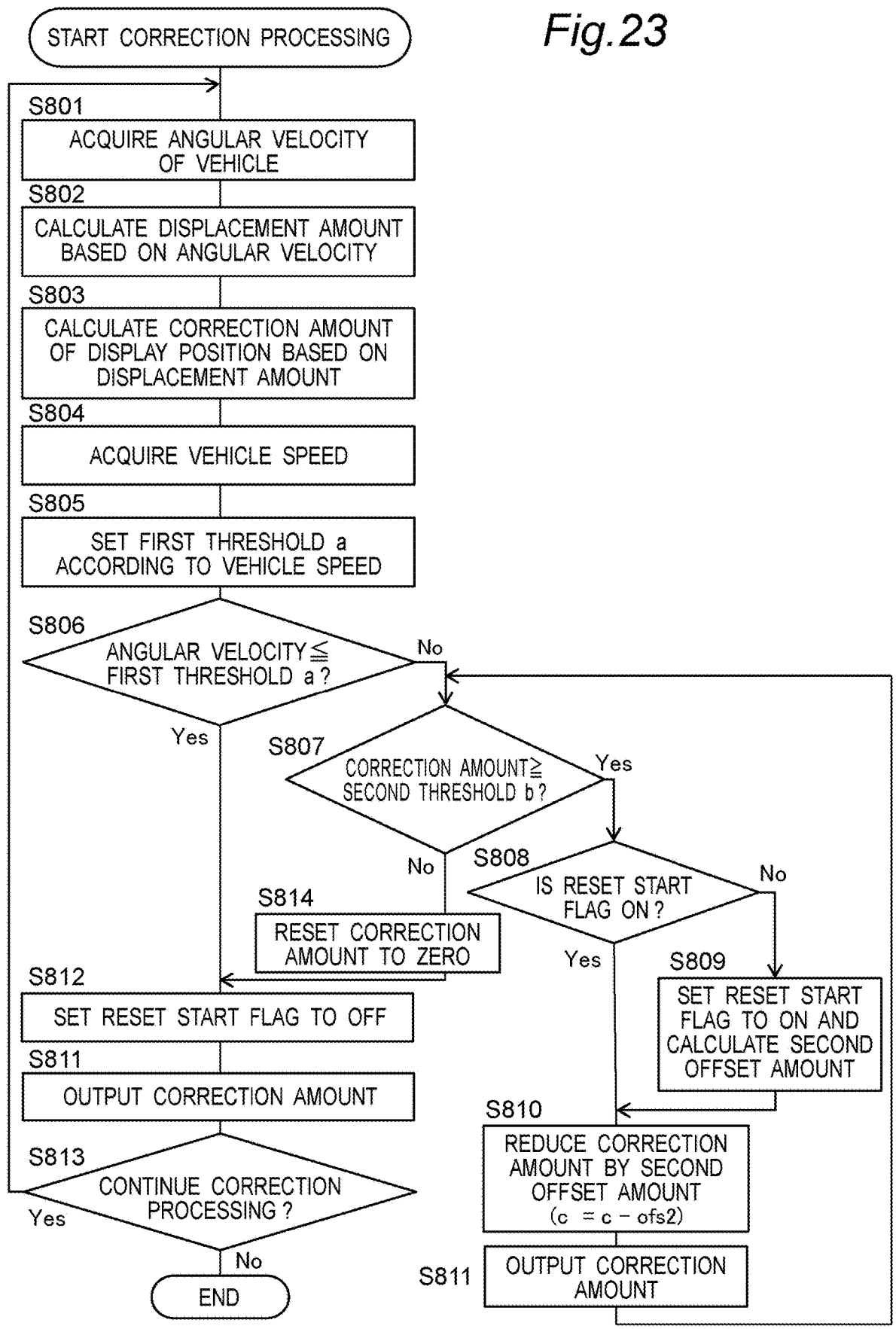
FIG. 23 is a flowchart showing correction processing in a seventh embodiment.

FIG. 23 shows the correction processing in a seventh embodiment. Steps S801 to S807, S811, and S813 of FIG. 23 of the seventh embodiment are the same as Steps S501 to S517, S509, and S510 of FIG. 18 of the fourth embodiment. Further, Steps S808 to S810 of FIG. 23 of the seventh embodiment are the same as Steps S708 to S710 of FIG. 22 of the sixth embodiment.

In the present embodiment, in a case where the angular velocity is larger than the first threshold a (No in S806), the correction amount calculator 52d determines whether or not the correction amount c based on the displacement amount y calculated in Step S803 is equal to or more than the second threshold b (S807). The determination unit 52b may make the determination in Step S807.

If the correction amount c is equal to or more than the second threshold b (Yes in Step S807), the correction amount calculator 52d determines whether or not the reset start flag is set to ON (S808). When the correction amount calculator 52d determines that the reset start flag is not set to ON (No in S808), the correction amount calculator 52d sets the reset start flag to ON and calculates the second offset amount ofs2 (S809). Next, the correction amount calculator 52d reduces the correction amount c by the calculated second offset amount ofs2 (S810). The correction amount calculator 52d outputs the reduced correction amount c to the display processing device 30 (S811).

Next, returning to Step S807, the correction amount calculator 52d again determines whether or not the correction amount c is equal to or more than the second threshold b. When the correction amount calculator 52d determines that the correction amount c is equal to or more than the second threshold b (Yes in S807), the correction amount calculator 52d determines whether or not the reset start flag is set to ON (S808). If the reset start flag is set to ON (Yes in S808), the correction amount c is again reduced by the offset amount ofs2 (S810). In this manner, when the correction amount c is gradually reduced and the correction amount c becomes less than the second threshold b, the correction amount calculator 52d determines that the correction amount c is less than the second threshold b in the determination in Step S807 (No in S807), and the correction amount calculator 52d resets the correction amount c to zero (S814). After that, the correction amount calculator 52d sets the reset start flag to OFF (S812).

For example, if the reset start flag is set to ON at the time t1, the correction amount gradually decreases while the reset start flag is set to ON, and the correction amount becomes less than the second threshold b at a time t5 that is after a reset time $\Delta t2$ from the time t1. Note that the configuration may be such that the reset time $\Delta t2$ is set in advance, an offset amount in one sampling (one cycle from S807 to S811 in the flowchart) is set to $(C1-b) \times ts/\Delta t2$ from the sampling period ts and the correction amount c1 at the start of resetting, and the correction amount is reduced by $(C1-b) \times ts/\Delta t2$ at a time. If the correction amount c is less than the second threshold b, the correction amount c is immediately reset to zero.

As described above, in a case where the angular velocity is larger than the first threshold a, the correction processing device 50 reduces the correction amount c by a certain amount at a time so that the correction amount c approaches zero when the correction amount c is equal to or more than the second threshold b, and resets the correction amount c to zero when the correction amount c is smaller than the second threshold b. In this manner, it is possible to perform the correction of the display position and the elimination of the accumulated error without causing any visual discomfort.

Eighth Embodiment

The first to seventh embodiments describe the display system 100 that displays a virtual image in front of the windshield of the vehicle. However, the correction of the display position of the image according to the present disclosure may be realized by a single device without limitation to the display system 100 including a plurality of devices.

Figure 24:
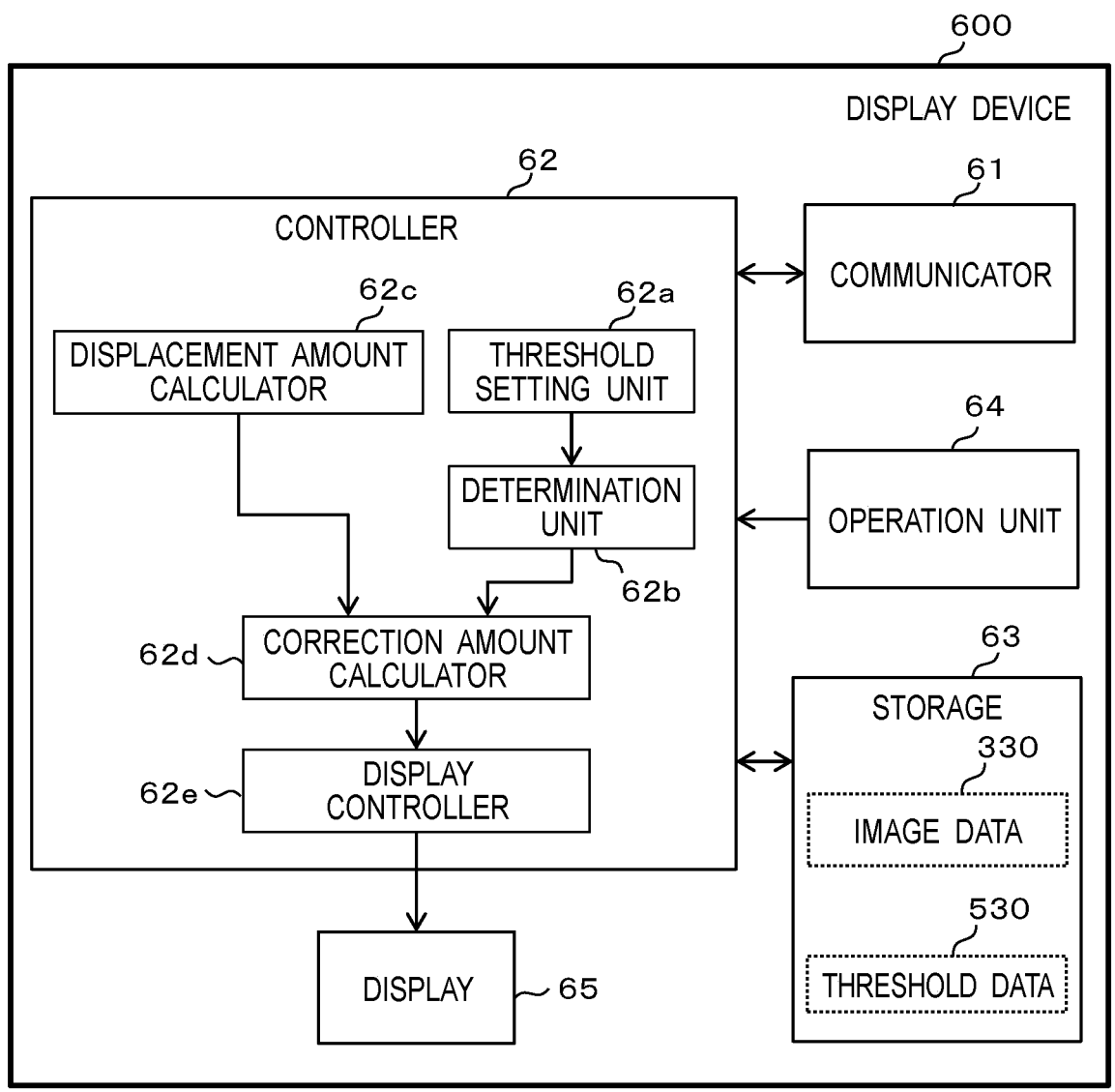
FIG. 24 is a block diagram showing a configuration of a display device in an eighth embodiment.

FIG. 24 shows a configuration of a display device in an eighth embodiment. A display device 600 of the present embodiment is a device that displays an image according to, for example, the traveling of the vehicle 200. The display device 600 is, for example, various information processing devices such as a personal computer, a tablet terminal, a smartphone, and the like. The display device 600 corresponds to, for example, a device in which the display processing device 30 and the correction processing device 50 of the display system 100 in FIG. 2 are integrally formed.

The display device 600 includes a communicator 61, a controller 62, a storage 63, an operation unit 64, and a display 65.

The communicator 61 has a function or a structure equivalent to that of the communicator 31 or the communicator 51.

The controller 62 has a function or a structure equivalent to that of the display controller 32 and the correction controller 52. Specifically, the controller 62 includes a threshold setting unit 62a, a determination unit 62b, a displacement amount calculator 62c, a correction amount calculator 62d, and a display controller 62e. The threshold setting unit 62a, the determination unit 62b, the displacement amount calculator 62c, the correction amount calculator 62d, and the display controller 62e in the present embodiment respectively correspond to the threshold setting unit 52a, the determination unit 52b, the displacement amount calculator 52c, the correction amount calculator 52d, and the display controller 32 of the first to seventh embodiments.

The storage 63 corresponds to the storage 33 and the storage 53, and stores the image data 330 and the threshold data 530.

The operation unit 64 is a user interface for inputting various operations by the user. For example, the operation unit 64 is a touch panel provided on the surface of the display 65. The operation unit 64 may be realized by a keyboard, a button, a switch, or a combination of these, other than the touch panel.

The display 65 is composed of, for example, a liquid crystal display or an organic EL display. The display 65 displays, for example, an image indicated by the image data 330 at the display position indicated by "reference position P0+correction amount c" designated by the display controller 62*e*.

The display device 600 may be connected to a projector or may be incorporated in a projector. The display 65 may include a function or a structure equivalent to that of the projection device 10.

As described above, the display device 600 includes the acquisition unit, the display 65, and the controller 62. For example, the communicator 61 corresponds to an acquisition unit that acquires the speed information indicating the speed of the moving body and the variation amount information indicating the posture variation amount of the moving body. The display 65 displays an image at the display position based on the reference position and the correction amount. The controller 62 sets the correction amount based on the speed and the posture variation amount. Specifically, the controller 62 sets a threshold based on a speed. The controller 62 sets the correction amount based on the posture variation amount during a period in which the posture variation amount is less than or equal to the threshold, and returns the display position to the reference position during a period in which the posture variation amount is larger than the threshold.

According to the present embodiment, an effect equivalent to that of the first embodiment can be obtained.

Other Embodiments

As described above, the first to eighth embodiments have been described as an example of the technique disclosed in the present application. However, the technique in the present disclosure is not limited to this, and is also applicable to an embodiment in which changes, replacements, additions, omissions, and the like are appropriately made. Further, the constituents described in the first to eighth embodiments can also be combined to form a new embodiment. In view of the above, other embodiments will be exemplified below.

In the first to seventh embodiments, the speed information is output from the information acquisition device 20 to the correction processing device 50 via the display processing device 30. However, the information acquisition device 20 may directly output the speed information to the correction processing device 50.

In the above embodiment, the information acquisition device 20 acquires the speed information indicating the speed of the vehicle 200 by the vehicle speed sensor 23. However, the speed of the vehicle 200 may be acquired from another device or by another method without limitation to the vehicle speed sensor 23. For example, the speed may be calculated from the position information obtained from the GPS module 21. The speed may be calculated from the acceleration of the vehicle 200 obtained from an acceleration sensor or the like.

The above embodiment describes the example in which the information acquisition device 20 includes the GPS module 21, the camera 22, and the vehicle speed sensor 23. However, the information acquisition device 20 may include a distance sensor that measures a distance and a direction from the vehicle 200 to a surrounding object, and may output distance information indicating the measured distance and direction to the display processing device 30. The information acquisition device 20 may include a navigation system. The information acquisition device 20 may include one or more of the GPS module 21, a distance sensor, the camera 22, an image processing device, an acceleration sensor, a radar, a sound wave sensor, and a white line detection device of advanced driver-assistance systems (ADAS). The GPS module 21, the distance sensor, the camera 22, the vehicle speed sensor 23, and the like having a function as the information acquisition device 20 may be built in one device or individually attached to the vehicle 200. Further, the vehicle speed information includes all pieces of information with which the speed of the vehicle 200 can be determined.

The above embodiment describes the example in which the posture detection device 40 includes the gyro sensor 41. However, the posture detection device 40 may include an acceleration sensor that detects the acceleration of the vehicle 200, and may output the detected acceleration as the posture variation information. The posture detection device 40 may include a vehicle height sensor that detects the height from the road surface, and may output the detected height as the posture variation information. The posture detection device 40 may include other publicly-known sensors. The posture detection device 40 may include one or more of the gyro sensor 41, the acceleration sensor, the vehicle speed sensor, and the like. In this case, the gyro sensor 41 having the function of the posture detection device 40, the acceleration sensor, the vehicle height sensor, and the like may be built in one device or individually attached to the vehicle 200.

The first to seventh embodiments illustrate the case where the projection device 10, the information acquisition device 20, the display processing device 30, the posture detection device 40, and the correction processing device 50 are separate devices. However, a plurality of devices may be integrally formed as one device. For example, the display processing device 30 and the correction processing device 50 may be integrally formed as one device. The information acquisition device 20 and the display processing device 30 may be integrally formed as one device. The posture detection device 40 and the correction processing device 50 may be integrally formed as one device. The separately formed devices are connected in a manner communicable with each other by wire or wirelessly. Note that all the projection device 10, the information acquisition device 20, the display processing device 30, the posture detection device 40, and the correction processing device 50 may be formed as one device. In this case, the communicators 31 and 51 may be omitted.

The above embodiment describes the case where the moving body is the vehicle 200 such as an automobile. However, the moving body is not limited to the vehicle 200. The moving body may be a vehicle on which a person rides, and may be, for example, an airplane or a ship. The moving body may be an unmanned moving body. The moving body may be one that vibrates instead of one that travels.

The first to seventh embodiments describe the examples in which the display system 100 is an HUD system. However, the display system 100 does not need to be an HUD system. The display system 100 may include a liquid crystal display or an organic EL display instead of the projection device 10. Display system 100 may include a screen and a projector.

In the above embodiment, the display position is reset by comparing the angular velocity of the moving body with the threshold. However, the display position may be reset by comparing the angle of the moving body with a threshold.

The above embodiment describes the case where the image is displayed in front of the moving body. However, the position where the image is displayed is not limited to the front. For example, the image may be displayed in the side direction or in the rear of the moving body.

Summary of Embodiment (1) A display system of the present disclosure includes an acquisition device that acquires speed information indicating a speed of a moving body, a detection device that detects a posture variation amount of the moving body, a display processing device that controls a display position of an image based on a reference position and a correction amount, and a correction processing device that sets the correction amount based on the speed and the posture variation amount. The correction processing device estimates whether or not the correction amount becomes equal to or more than a predetermined amount based on the speed and the posture variation amount, and adjusts the correction amount based on the estimation result.

In this manner, it is possible to suppress the position displacement of the image with high accuracy. For example, irrespective of the speed of the moving body, resetting is performed in a case where a vibration amplitude of posture variation exceeds the correction range (threshold), and correction is performed when the vibration amplitude of the posture vibration is within the correction range, so that highly accurate position displacement correction that achieves both correction and resetting and quality of appearance at the time of resetting can be realized. For example, by changing the display position based on the posture variation amount, it is possible to accurately suppress the position displacement of an image due to the posture variation. By returning the display position to the reference position, it is possible to suppress the position displacement of the image due to the accumulation of the correction error.

(2) In the display system of (1), the correction processing device
sets a first threshold based on the speed, and sets the correction amount based on the posture variation amount during a period in which the posture variation amount is equal to or less than the first threshold, and the display processing device returns the display position to the reference position during a period in which the posture variation amount is larger than the first threshold. By returning the display position to the reference position, it is possible to suppress the position displacement of the image due to the accumulation of the correction error.

(3) In the display system of (2), the correction processing device may set the first threshold such that the first threshold increases as the speed increases.

In this manner, for example, even in a case where the moving body moves at a low speed and a vibration frequency is low, the display position can be returned to the reference position. Further, even in a case where the moving body moves at a high speed and the vibration frequency is high, the display position can be changed by the correction amount based on the posture variation amount.

(4) In the display system of (3), the posture variation amount is an angular velocity of the moving body.

In this manner, resetting of the display position can be performed according to a sudden posture change of the moving body.

(5) In the display system of (4), the correction processing device may reset the correction amount to zero when the angular velocity is larger than the first threshold.

(6) In the display system of (4), the correction processing device may reduce the correction amount by a predetermined amount so that the correction amount approaches zero when the angular velocity is larger than the first threshold.

(7) In the display system of (4), in a case where the angular velocity is larger than the first threshold, the correction processing device may reduce the correction amount by a predetermined amount so that the correction amount approaches zero when the correction amount is equal to or more than a second threshold, and reset the correction amount to zero when the correction amount is smaller than the second threshold.

(8) In the display system of (5), the correction processing device may include a first calculator that calculates an angle of the moving body from the angular velocity, and a second calculator that calculates the correction amount by converting the angle into a number of pixels, and the second calculator may calculate the correction amount based on a difference between the angle and a predetermined angle or a difference between the number of pixels and a predetermined number of pixels, and set the predetermined angle or the predetermined number of pixels so that the correction amount becomes zero when the angular velocity is larger than the first threshold.

(9) In the display system of (5), the correction processing device may include a first calculator that calculates an angle of the moving body from the angular velocity, and a second calculator that calculates the correction amount by converting the angle into a number of pixels, and the first calculator may reset the angle to zero when the angular velocity is larger than the first threshold.

(10) In the display system of (4), the display processing device may control a display position of the image based on the reference position, the correction amount, and a shift amount, and the correction processing device may set the shift amount based on the correction amount of when the angular velocity is larger than the first threshold.

(11) The display system of (1) may further include a projection device that projects light representing an image.

(12) In the display system of (11), the moving body may be a vehicle, and the image may be a virtual image displayed in front of a windshield of a vehicle.

(13) A display device of the present disclosure includes an acquisition unit that acquires speed information indicating a speed of a moving body and variation amount information indicating a posture variation amount of the moving body, a display that displays an image at a display position based on a reference position and a correction amount, and
a controller that sets the correction amount based on the speed and the posture variation amount. The controller
sets a threshold based on the speed, sets the correction amount based on the posture variation amount during a period in which the posture variation amount is equal to or less than the threshold, and returns the display position to the reference position during a period in which the posture variation amount is larger than the threshold.

(14) A display control method of the present disclosure is a display control method performed by an arithmetic unit of a computer. The display control method includes the steps of acquiring speed information indicating a speed of a moving body and variation amount information indicating a posture variation amount of the moving body, and controlling a display position of an image based on a reference position and a correction amount. The step of controlling the display position includes setting a threshold based on the speed, setting the correction amount based on the posture variation amount during a period in which the posture variation amount is equal to or less than the threshold, and returning the display position to the reference position during a period in which the posture variation amount is larger than the threshold.

The display system, the display device, and the display control method according to all claims of the present disclosure are realized by cooperation with hardware resources, for example, a processor, a memory, and a program, and the like.

The present disclosure can be applied to a display device and a display system that display a virtual image in front of a windshield of a vehicle.

EXPLANATIONS OF LETTERS OR NUMERALS

10 Projection device
20 Information acquisition device
21 GPS module
22 Camera
23 Vehicle speed sensor
30 Display processing device
31 Communicator
32 Display controller
33 Storage
40 Posture detection device
41 Gyro sensor
50 Correction processing device
51 Communicator
52 Correction controller
52a Threshold setting unit
52b Determination unit
52c Displacement amount calculator
52d Correction amount calculator
53 Storage
100 Display system
600 Display device

What is claimed is:

1. A display system comprising:
an acquisition device that acquires speed information indicating a speed of a moving body;
a detection device that detects a posture variation amount, which is an angular velocity of the moving body;
a display processing device that controls a display position of an image based on a reference position and a correction amount; and
a correction processing device that sets the correction amount based on the speed and the posture variation amount, wherein
the correction processing device
estimates whether or not the correction amount becomes equal to or more than a predetermined amount based on the speed and the posture variation amount, and
adjusts the correction amount based on the estimation result,
wherein
the correction processing device
sets a first threshold based on the speed, and
sets the correction amount based on the posture variation amount during a period in which the posture variation amount is equal to or less than the first threshold,
the display processing device returns the display position to the reference position during a period in which the posture variation amount is larger than the first threshold, and the correction processing device sets the first threshold such that the first threshold increases as the speed increases.

2. The display system according to claim 1, wherein the correction processing device resets the correction amount to zero when the angular velocity is larger than the first threshold.

3. The display system according to claim 1, wherein the correction processing device reduces the correction amount by a predetermined amount so that the correction amount approaches zero when the angular velocity is larger than the first threshold.

4. The display system according to claim 1, wherein in a case where the angular velocity is larger than the first threshold,
the correction processing device
reduces the correction amount by a predetermined amount so that the correction amount approaches zero when the correction amount is equal to or more than a second threshold, and
resets the correction amount to zero when the correction amount is smaller than the second threshold.

5. The display system according to claim 2, wherein the correction processing device includes
a first calculator that calculates an angle of the moving body from the angular velocity, and
a second calculator that calculates the correction amount by converting the angle into a number of pixels, and
the second calculator
calculates the correction amount based on a difference between the angle and a predetermined angle or a difference between the number of pixels and a predetermined number of pixels, and
sets the predetermined angle or the predetermined number of pixels so that the correction amount becomes zero when the angular velocity is larger than the first threshold.

6. The display system according to claim 2, wherein the correction processing device includes
a first calculator that calculates an angle of the moving body from the angular velocity, and
a second calculator that calculates the correction amount by converting the angle into a number of pixels, and
the first calculator resets the angle to zero when the angular velocity is larger than the first threshold.

7. The display system according to claim 1, wherein the display processing device controls a display position of the image based on the reference position, the correction amount, and a shift amount, and
the correction processing device sets the shift amount based on the correction amount of when the angular velocity is larger than the first threshold.

8. The display system according to claim 1, further comprising a projection device that projects light representing the image.

9. The display system according to claim 8 wherein the moving body is a vehicle, and
the image is a virtual image displayed in front of a windshield of the vehicle.

10. A display system comprising:
an acquisition device that acquires speed information indicating a speed of a moving body;
a detection device that detects a posture variation amount of the moving body;

a display processing device that controls a display position of an image based on a reference position and a correction amount; and a correction processing device that sets the correction amount based on the speed and the posture variation amount, wherein the correction processing device
sets a first threshold such that the first threshold increases as the speed increases, and sets the correction amount based on the posture variation amount during a period in which the posture variation amount is equal to or less than the first threshold, and the display processing device returns the display position to the reference position during a period in which the posture variation amount is larger than the first threshold.

* * * * *